(12) United States Patent
Maruyama et al.

(10) Patent No.: US 10,198,126 B2
(45) Date of Patent: Feb. 5, 2019

(54) POSITION INPUTTING DEVICE AND DISPLAY DEVICE WITH POSITION INPUTTING FUNCTION

(71) Applicant: Sharp Kabushiki Kaisha, Sakai, Osaka (JP)

(72) Inventors: Takenori Maruyama, Sakai (JP); Kazutoshi Kida, Sakai (JP); Kenshi Tada, Sakai (JP); Hiroyuki Ogawa, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/529,091

(22) PCT Filed: Nov. 20, 2015

(86) PCT No.: PCT/JP2015/082661
§ 371 (c)(1),
(2) Date: May 24, 2017

(87) PCT Pub. No.: WO2016/084728
PCT Pub. Date: Jun. 2, 2016

(65) Prior Publication Data
US 2017/0262131 A1    Sep. 14, 2017

(30) Foreign Application Priority Data

Nov. 28, 2014  (JP) ................. 2014-241326

(51) Int. Cl.
| G06F 3/041 | (2006.01) |
| G02F 1/1343 | (2006.01) |
| G06F 3/044 | (2006.01) |
| G06F 3/047 | (2006.01) |
| G02F 1/1333 | (2006.01) |
| G02F 1/1368 | (2006.01) |
| G02F 1/1337 | (2006.01) |

(52) U.S. Cl.
CPC ........ *G06F 3/0418* (2013.01); *G02F 1/13338* (2013.01); *G02F 1/133345* (2013.01);
(Continued)

(58) Field of Classification Search
CPC ........ G06F 3/044; G06F 3/041; G06F 3/0418; G06F 3/047; G06F 2203/04102
See application file for complete search history.

(56) References Cited

U.S. PATENT DOCUMENTS 9,372,569 B2    6/2016  Teramoto
2012/0062511 A1  3/2012  Ishizaki et al.
(Continued)

FOREIGN PATENT DOCUMENTS

CN    203178948 U    9/2013
JP    2012-063839 A    3/2012
(Continued)

*Primary Examiner* — Md Saiful A Siddiqui
(74) *Attorney, Agent, or Firm* — ScienBiziP, P.C.

(57) ABSTRACT

A touchscreen pattern includes detection electrodes, drive electrodes, floating electrodes, and wide detection electrodes. The detection electrodes extend along a first direction and are arranged along a second direction perpendicular to the first direction. The drive electrodes extend along the second direction and are arranged along the first direction to overlap the detection electrodes in a plan view. The drive electrodes and the detection electrodes form capacitors. The floating electrodes are arranged adjacent to the detection electrodes 38, respectively, in the plan view and to overlap the drive electrodes in the plan view. The floating electrodes and the adjacent detection electrodes form capacitors. The floating electrodes and the overlapping drive electrodes form capacitors. The wide detection electrodes are arranged at the outermost with respect to the second direction. The wide detection electrodes have a width larger than a width of the detection electrodes closer to the middle.

12 Claims, 26 Drawing Sheets

(52) U.S. Cl.
CPC ........ *G02F 1/134309* (2013.01); *G06F 3/044* (2013.01); *G06F 3/047* (2013.01); *G06F 3/0412* (2013.01); *G02F 1/1368* (2013.01); *G02F 1/133305* (2013.01); *G02F 1/133707* (2013.01); *G02F 2001/133302* (2013.01); *G02F 2001/133357* (2013.01); *G02F 2201/121* (2013.01); *G02F 2201/123* (2013.01); *G06F 2203/04102* (2013.01)

(56) References Cited

U.S. PATENT DOCUMENTS

| | | | |
|---|---|---|---|
| 2013/0027348 A1* | 1/2013 | Oh | G06F 3/044 345/174 |
| 2014/0055412 A1* | 2/2014 | Teramoto | G06F 3/0412 345/174 |
| 2014/0104236 A1 | 4/2014 | Hamaguchi et al. | |
| 2014/0192018 A1 | 7/2014 | Kurasawa et al. | |
| 2016/0334907 A1 | 11/2016 | Ishizaki et al. | |

FOREIGN PATENT DOCUMENTS

| | | |
|---|---|---|
| JP | 2013-003603 A | 1/2013 |
| JP | 2013-232162 A | 11/2013 |
| JP | 2014-044537 A | 3/2014 |
| JP | 2014-130626 A | 7/2014 |
| JP | 2014-134982 A | 7/2014 |
| TW | 201419080 A | 5/2014 |

* cited by examiner

POSITION INPUTTING DEVICE AND DISPLAY DEVICE WITH POSITION INPUTTING FUNCTION

CROSS-REFERENCE TO RELATED APPLICATION(S)

The present application claims the benefit of and priority to PCT/JP2015/082661 filed Nov. 20, 2015, published as WO/2016/084728, on Jun. 2, 2016 and entitled "POSITION INPUT DEVICE AND DISPLAY DEVICE FITTED WITH POSITION INPUT FUNCTION" PCT/JP2015/082661 claims the benefit of and priority to Japanese patent application JP 2014-241326, filed Nov. 28, 2014.

TECHNICAL FIELD

The present invention relates to a position inputting device and a display device with a position inputting function.

BACKGROUND ART

In recent years, more and more electronic devices such as tablet personal computers and portable digital assistants include touchscreens to improve operability and usability. A user can enter information on a position on a display surface of the liquid crystal panel by touching the display surface of the liquid crystal panel with a finger or a stylus. According to this configuration, the user can perform intuitive operation, that is, the user can perform operation with direct feeling as if he or she directly touches an image displayed on the liquid crystal panel. Such a touchscreen is disclosed in Patent Document 1.

Patent Document 1 discloses a touch panel controller including a driving section, a differential amplifier, and correction means. The driving section is for driving drive lines DL1 to DL4 on the basis of a code sequence to output a first linear sum of capacitance values of electrostatic capacitors C31 to C34 between the respective drive lines DL1 to LD4 and a sense line SL3 and to output a second linear sum of capacitance values of electrostatic capacitors C41 to C44 between the respective drive lines DL1 to DL4 and a sense line SL4. The differential amplifier is for amplifying a difference between the first linear sum and the second linear sum. The correction means is for correcting a line dependency between the capacitance values of the electrostatic capacitors C31 to C34 and the capacitance values of the electrostatic capacitors C41 to C44.

RELATED ART DOCUMENT

Patent Document

Patent Document 1: Unexamined Japanese Patent Application Publication No. 2013-3603

Problem to be Solved by the Invention

The capacitance value related to the sense line at the outermost among the sense lines tends to be smaller than the capacitance value related to the sense line closer to the middle than the outermost sense line. Therefore, a difference in capacitance between the outermost sense line and the sense line adjacent to the outermost sense line tends to be larger than a difference in capacitance between the adjacent sense lines that are closer to the middle. If the position detection is performed by detecting the differences in capacitance between the adjacent sense lines as described in Patent Document 1, a large noise may be produced during the detection of the difference in capacitance between the outermost sense line and the sense line adjacent to the outermost sense line resulting in a local reduction in sensitivity in position detection.

DISCLOSURE OF THE PRESENT INVENTION

The present invention was made in view of the above circumstances. An object is to restrict a local reduction in sensitivity in position detection.

Means for Solving the Problem

A first position inputting device according to the present invention includes first position detection electrodes, second position detection electrodes, floating electrodes, and wide first position detection electrodes. The first position detection electrodes extend along a first direction. The first position detection electrodes are arranged along a second direction perpendicular to the first direction. The second position detection electrodes extend along the second direction. The second position detection electrodes are arranged along the first direction to overlap the first position detection electrodes in a plan view. The second position detection electrodes and the first position detection electrodes form capacitors. The floating electrodes are arranged adjacent to the first position detection electrodes, respectively, in a plan view and to overlap the second position detection electrodes in the plan view. The floating electrodes and the adjacent first position detection electrodes form capacitors. The floating electrodes and the overlapping second position detection electrodes from capacitors. The wide first position detection electrodes are included in the first position detection electrodes and arranged at outermost with respect to the second direction. The wide first position detection electrodes have a width larger than a width of the first position detection electrodes closer to the middle.

According to the configuration, the first detection electrodes and the second position detection electrodes that overlap the first detection electrodes form the capacitors. Furthermore, the floating electrodes and the adjacent first detection electrodes form the capacitors, and the floating electrodes and the overlapping second position detection electrodes form the capacitors. Therefore, higher sensitivity (an SN ratio) can be achieved in the position detection. The capacitance between each first detection electrode at the outermost with respect to the second direction among the first detection electrodes that are arranged along the second direction and the adjacent floating electrode tends to be smaller than the capacitance between each first detection electrode closer to the middle and the adjacent floating electrode. Therefore, the difference in capacitance value tends to be larger and thus a large noise may be generated in the position detection resulting in a local reduction in sensitivity in the position detection. The first detection electrodes at the outermost with respect to the second direction among the first detection electrodes are configured as the wide first position detection electrodes having the width larger than the width of the first positon detection electrodes closer to the middle. Therefore, the capacitance between each wide first position detection electrode and the adjacent floating electrode is larger and thus the difference in capacitance value relative to the first position detection electrodes closer to the middle can be reduced. According to the configuration, the wide first position detection electrodes are less likely to be subject to the noise in the position detection and thus the local reduction in sensitivity in the position detection is less likely to occur in the edge areas.

A second position inputting device according to the present invention includes first position detection electrodes, second position detection electrodes, floating electrodes, branched-type first position detection electrodes, and inter-branch-electrode floating electrodes. The first position detection electrodes extend along a first direction. The first positon detection electrodes are arranged along a second direction perpendicular to the first direction. The second position detection electrodes extend along the second direction. The second position detection electrodes are arranged along the first direction to overlap the first position detection electrodes in a plan view. The second position detection electrodes and the first position detection electrodes form capacitors. The floating electrodes are arranged adjacent to the first position detection electrodes, respectively, in a plan view and to overlap the second position detection electrodes in the plan view. The floating electrodes and the adjacent first position detection electrodes form capacitors. The floating electrodes and the overlapping second position detection electrodes form capacitors. The branched-type first position detection electrodes are included in the first position detection electrodes and arranged at outermost with respect to the second direction. Each of the branched-type first position detection electrodes includes branch electrodes that extend in the first direction. The branch electrodes are arranged along the second direction and connected together. The inter-branch-electrode floating electrodes are sandwiched between the branch electrodes. The inter-branch-electrode floating electrodes and the branch electrodes form capacitors.

According to the configuration, the first detection electrodes and the second position detection electrodes that overlap the first detection electrodes form the capacitors. Furthermore, the floating electrodes and the adjacent first detection electrodes form the capacitors, and the floating electrodes and the overlapping second position detection electrodes form the capacitors. Therefore, higher sensitivity (an SN ratio) can be achieved in the position detection. The capacitance between each first detection electrode at the outermost with respect to the second direction among the first detection electrodes that are arranged along the second direction and the adjacent floating electrode tends to be smaller than the capacitance between each first detection electrode closer to the middle and the adjacent floating electrode. Therefore, the difference in capacitance value tends to be larger and thus a large noise may be generated in the position detection resulting in a local reduction in sensitivity in the position detection. The first detection electrodes at the outermost with respect to the second direction among the first detection electrodes are configured as the branched-type first position detection electrodes each including the branch electrodes extending in the first direction and being arranged along the second direction and connected together. Furthermore, the branch electrodes and the inter-branch-electrode floating electrodes sandwiched therebetween form the capacitors. Therefore, the capacitance of each branched-type first position detection electrode is larger and thus the difference in capacitance value relative to the first position detection electrodes closer to the middle can be reduced. According to the configuration, the branched-type first position detection electrodes are less likely to be subject to the noise in the position detection and thus the local reduction in sensitivity in the position detection is less likely to occur in the edge areas.

Preferred embodiments of the second position inputting device according to the present invention may include the following configurations.

(1) A sum of the widths of the branch electrodes of each of the branched-type first position detection electrodes may be equal to the width of each of the first positon detection electrodes closer to the middle. According to the configuration, in the position inputting device, an occupied area of the branched-type first position detection electrodes and an occupied area of the first detection electrodes closer to the middle can be about equal to each other. Namely, the local reduction in sensitivity in the position detection can be restricted by the branched-type first position detection electrodes while the occupied area of the first position detection electrodes is maintained.

A third position inputting device according to the present invention includes first position detection electrodes, second position detection electrodes, first floating electrodes, and second floating electrodes. The first position detection electrodes extend along a first direction. The first position detection electrodes are arranged along a second direction perpendicular to the first direction. The second position detection electrodes extend along the second direction. The second position detection electrodes are arranged along the first direction to overlap the first position detection electrodes in a plan view. The second position detection electrodes and the first position detection electrodes form capacitors. The first floating electrodes are arranged adjacent to the first position detection electrodes, respectively, in a plan view and to overlap the second position detection electrodes in the plan view. The floating electrodes and the adjacent first position detection electrodes form capacitors. The floating electrodes and the overlapping second position detection electrodes form capacitors. The second floating electrodes are arranged adjacent to and outer than the first floating electrodes with respect to the second direction. The first floating electrodes are adjacent to and outer than the first position detection electrodes arranged at the outermost with respect to the second direction. The second floating electrodes are arranged not to overlap the second position detection electrodes. The second floating electrodes and the first position detection electrodes at the outermost form capacitors.

According to the configuration, the first detection electrodes and the second position detection electrodes that overlap the first detection electrodes form the capacitors. Furthermore, the first floating electrodes and the adjacent first detection electrodes form the capacitors, and the first floating electrodes and the overlapping second position detection electrodes form the capacitors. Therefore, higher sensitivity (an S/N ratio) can be achieved in the position detection. The capacitance between each first detection electrode at the outermost with respect to the second direction among the first detection electrodes that are arranged along the second direction and the adjacent first floating electrode tends to be smaller than the capacitance between each first detection electrode closer to the middle and the adjacent floating electrode. Therefore, the difference in capacitance value tends to be larger and thus a large noise may be generated in the position detection resulting in a local reduction in sensitivity in the position detection. The second floating electrodes are arranged adjacent to and outer than the first floating electrodes that are adjacent to and outer than the first detection electrodes at the outermost with respect to the second direction and not to overlap the second position detection electrodes. The second floating electrodes and the first position detection electrodes at the outermost form the capacitors. Therefore, large capacitances of the first position detection electrodes at the outermost can be achieved and thus the differences in capacitance value between the first position detection electrodes at the outermost and the first position detection electrodes closer to the middle can be reduced. According to the configuration, the first position detection electrodes at the outermost are less likely to be subject to the noise in the position detection and thus the local reduction in sensitivity in the position detection is less likely to occur in the edge areas.

Preferred embodiments of the third position inputting device according to the present invention may include the following configurations.

(1) The first floating electrodes may include segment first floating electrodes separated from one another in the first direction to overlap the second position detection electrodes, respectively. The second floating electrodes may extend longer than the segment first floating electrodes in the first direction. According to the configuration, the capacitances between any of the second position detection electrodes and the segment first floating electrodes in the first floating electrodes overlapping the second position detection electrodes are less likely to be affected by the potentials of the other second position detection electrodes adjacent to the second position detection electrodes. The second floating electrodes do not overlap the second position detection electrodes. Therefore, the second floating electrodes are less likely to be affected by the potentials of the second position detection electrodes. The second floating electrodes can be formed to extend longer then the segment first floating electrodes in the first direction. According to the configuration, large capacitances between the adjacent first detection electrodes can be achieved.

(2) The second floating electrodes may be formed from a transparent electrode film that forms the first floating electrodes. According to the configuration, a cost for forming the first floating electrodes and the second floating electrodes can be reduced.

(3) The first floating electrodes may be formed in a layer different from a layer in which the second floating electrodes are formed. The position inputting device may further include an insulating layer between the layers. According to the configuration, the first floating electrodes and the second floating electrodes are properly insulated from each other with the insulating layer.

Preferred embodiments of the first position inputting device, the second position inputting device, and the third position inputting device according to the present invention may include the following configurations.

(1) The floating electrodes or the first floating electrodes may include narrow floating electrodes or narrow first floating electrodes having a width smaller than a width of the floating electrodes or the first floating electrodes closer to the middle. Two first detection electrodes are adjacent to each floating electrode or each first floating electrode closer to the middle among the floating electrodes or the first floating electrodes. Each floating electrode or each first floating electrode closer to the middle and the two first detection electrodes form the capacitors. On the other hand, one detection electrode or one first floating electrode is adjacent to each floating electrode or each first floating electrode at the outermost with respect to the second direction among the floating electrodes or the first floating electrodes. Each floating electrode or each first floating electrode at the outermost and the first detection electrode form the capacitor. Therefore, by forming the narrow floating electrodes or the narrow first floating electrodes having the width smaller than the width of the floating electrodes or the first floating electrodes closer to the middle at the outermost with respect to the second direction, position detection areas to which the first detection electrodes are assigned for are equalized with respect to the second direction. In the configuration in which the floating electrodes include the narrow floating electrodes or the first floating electrodes include the narrow first floating electrodes, the capacitances of the first detection electrodes at the outermost with respect to the second direction tend to be smaller. According to the configuration, the capacitances of the first detection electrodes at the outermost with respect to the second direction can be increased and thus the first detection electrodes at the outermost with respect to the second direction are less likely to be subject to the noise in the position detection. Therefore, the local reduction in sensitivity in the position detection is less likely to occur in the edge areas.

Next, to solve the problem described earlier, a display device with a position inputting function includes at least the position inputting device described above and a display panel including the position inputting device.

Because the display device with a position inputting function includes the display panel and the position inputting device, position input by a user and display of information on the display panel can be smoothly linked together. This configuration is preferable for improving the usability.

Preferred embodiments of the display device with a position inputting function according to the present invention may include the following configurations.

(1) The display panel may include an array board and a common board. The array board may include at least display components arranged in a display area in which an image is displayed. The common board may be arranged opposite the array board with a gap. The position inputting device may be integrated with the display panel such that the second position detection electrodes may be arranged on a plate surface of the common board facing the array board in the display area. The first position detection electrodes and the floating electrodes or the first floating electrodes may be arranged on a plate surface of the common board opposite from the array board in the display area. Because the position inputting device may be integrated with the display panel, this configuration is preferable for reducing the thickness or the cost of the display device with a position detection function in comparison to a configuration including a position inputting device that is provided separately from the display device.

Advantageous Effect of the Invention

According to the present invention, a local reduction in sensitivity in position detection can be restricted.

MODE FOR CARRYING OUT THE INVENTION

First Embodiment

Figure 1:
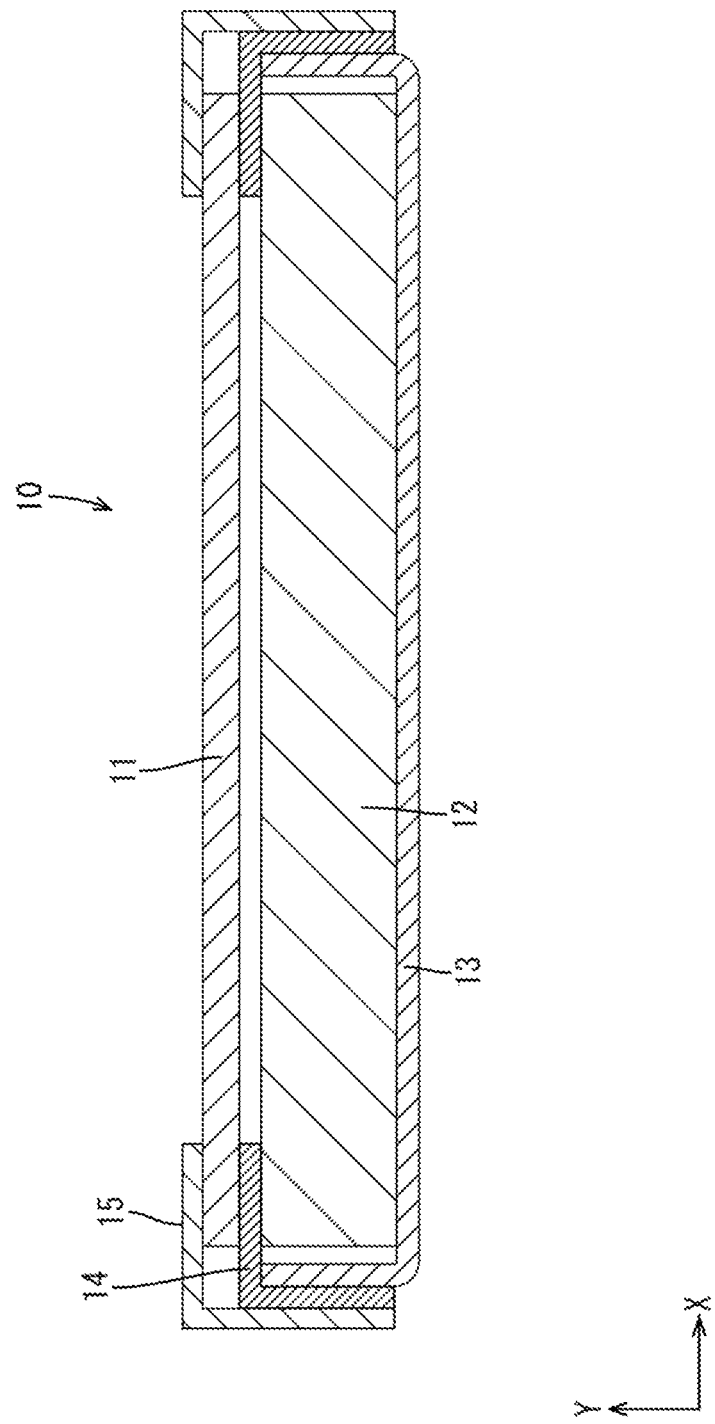
FIG. 1 is a cross-sectional view of a liquid crystal panel according to a first embodiment of the present invention.

A first embodiment of the present invention will be described with reference to FIGS. 1 to 13. In this section, a liquid crystal display device 10 with a position inputting function (a display device with a position inputting function) will be described. X-axes, Y-axes, and Z-axes may be present in the drawings. The axes in each drawing correspond to the respective axes in other drawings. The vertical direction is based on FIG. 2. An upper side and a lower side in FIG. 2 correspond to a front side and a back side of the liquid crystal display device 10, respectively.

Figure 2:
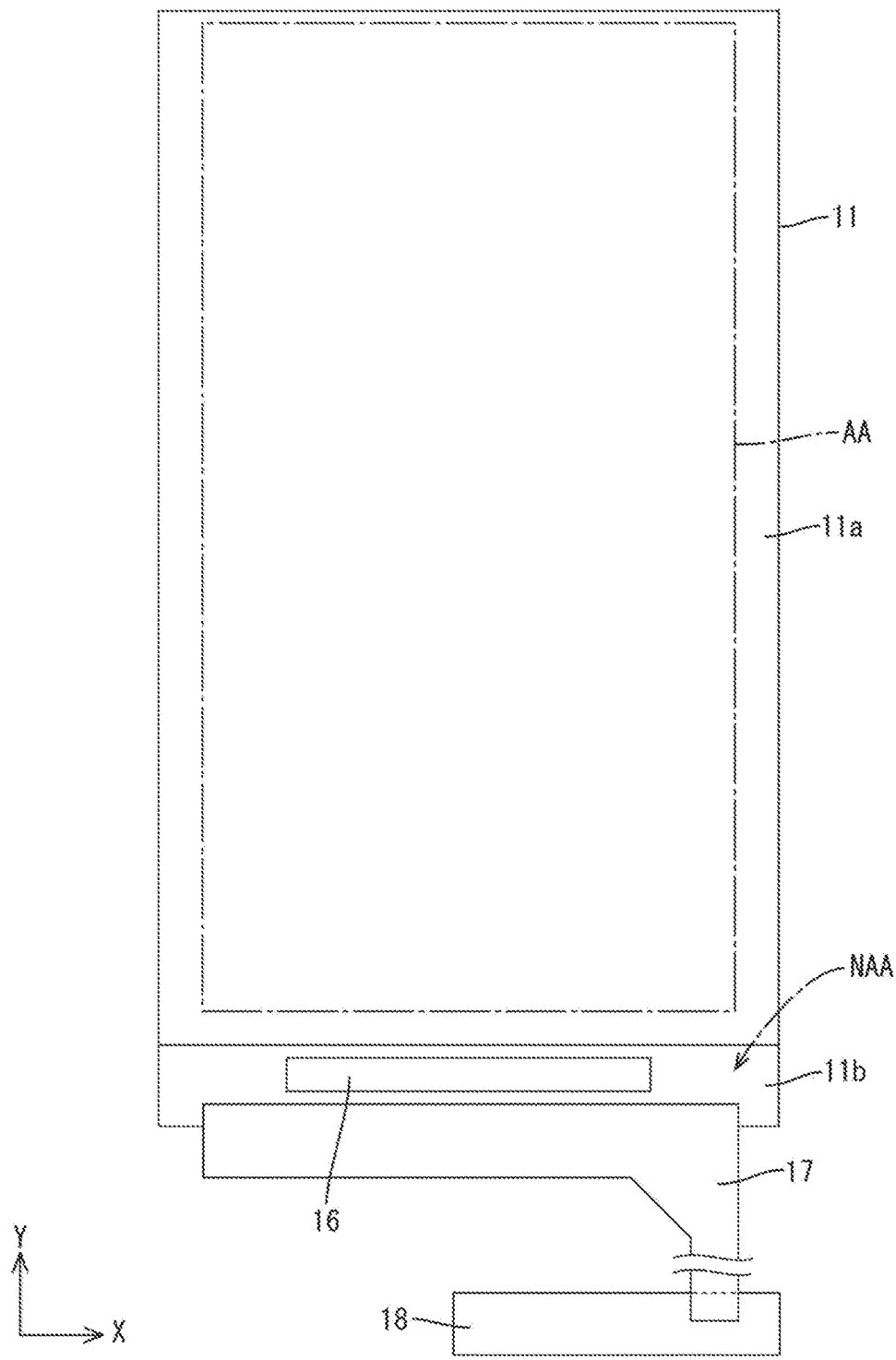
FIG. 2 is a plan view of a liquid crystal panel included in the liquid crystal display device.

As illustrated in FIGS. 1 and 2, the liquid crystal display device 10 includes a liquid crystal panel 11 (a display panel with a position inputting function) and a backlight unit 12 (a lighting device). The liquid crystal panel 11 is for display images and for detecting position information input by a user based on the images. The backlight unit 12 is an external light source for supplying light to the liquid crystal panel 11 used for image display. The liquid crystal display device 10 further includes a chassis 13, a frame 14, and a bezel 15 (a holding member). The chassis 13 holds the backlight unit 12 therein. The frame 14 holds the backlight unit 12 together with the chassis 13. The bezel 15 holds the liquid crystal panel 11 together with the frame 14. The backlight unit 12 includes at least a light source (e.g., cold cathode fluorescent tubes, LEDs, organic ELs) and an optical member having an optical function for converting light emitted by the light source into planar light.

The liquid crystal display device 10 according to this embodiment may be for various electronic devices (not illustrated) including mobile phones (including smartphones), notebook personal computers (including tablet personal computers), portable information terminals (including electronic books and PDAs), digital photo frames, and portable video game players. Therefore, a screen size of the liquid crystal panel 11 in the liquid crystal display device 10 may be some inches to 10 plus some inches, which is usually categorized as a small size display or a small-to-medium size display.

The liquid crystal panel 11 will be described. As illustrated in FIG. 2, the liquid crystal panel 11 has a vertically-long rectangular overall shape with a long-side direction and a short-side direction correspond with the Y-axis direction and the X-axis direction, respectively. The liquid crystal panel 11 includes a display area (an active area) AA and a non-display area (a non-active area) NAA. The display area AA is an area in which images are displayed and the non-display area NAA is an area in which the images are not displayed. The non-display area NAA has a picture frame shape (a frame shape) surrounding the display area AA. The display area AA is located closer to an edge of the liquid crystal panel 11 with respect to the long-side direction (on an upper side in FIG. 2). The non-display area NAA includes an area having a substantially frame shape surrounding the display area AA (a frame portion of a CF board 11a, which will be described later) and an area at the other end with respect to the long-side direction (on a lower side in FIG. 2, an exposed area of an array board 11b which does not overlap the CF board 11a and will be described later). The exposed area is a mounting area for a driver 16 (a panel driver) for driving the liquid crystal panel and a flexible circuit board 17 (an external connecting component). The flexible circuit board 17 has flexibility. The flexible circuit board 17 connects the liquid crystal panel 11 to a control circuit board 18 that is an external signal source. Various signals are transmitted from the control circuit board 18 to the driver 16 or other components via the flexible circuit board 17. The driver 16 includes an LSI chip containing a driver circuit therein. The driver 16 processes input signals from the control circuit board 18 and produces output signals. The driver 16 inputs the output signals to the display area AA of the liquid crystal panel 11. In FIG. 2, an outline of the display area AA having a frame shape slightly smaller than the CF board 11a is indicated with a chain line. An area outside the chain line is the non-display area NAA.

Figure 7:
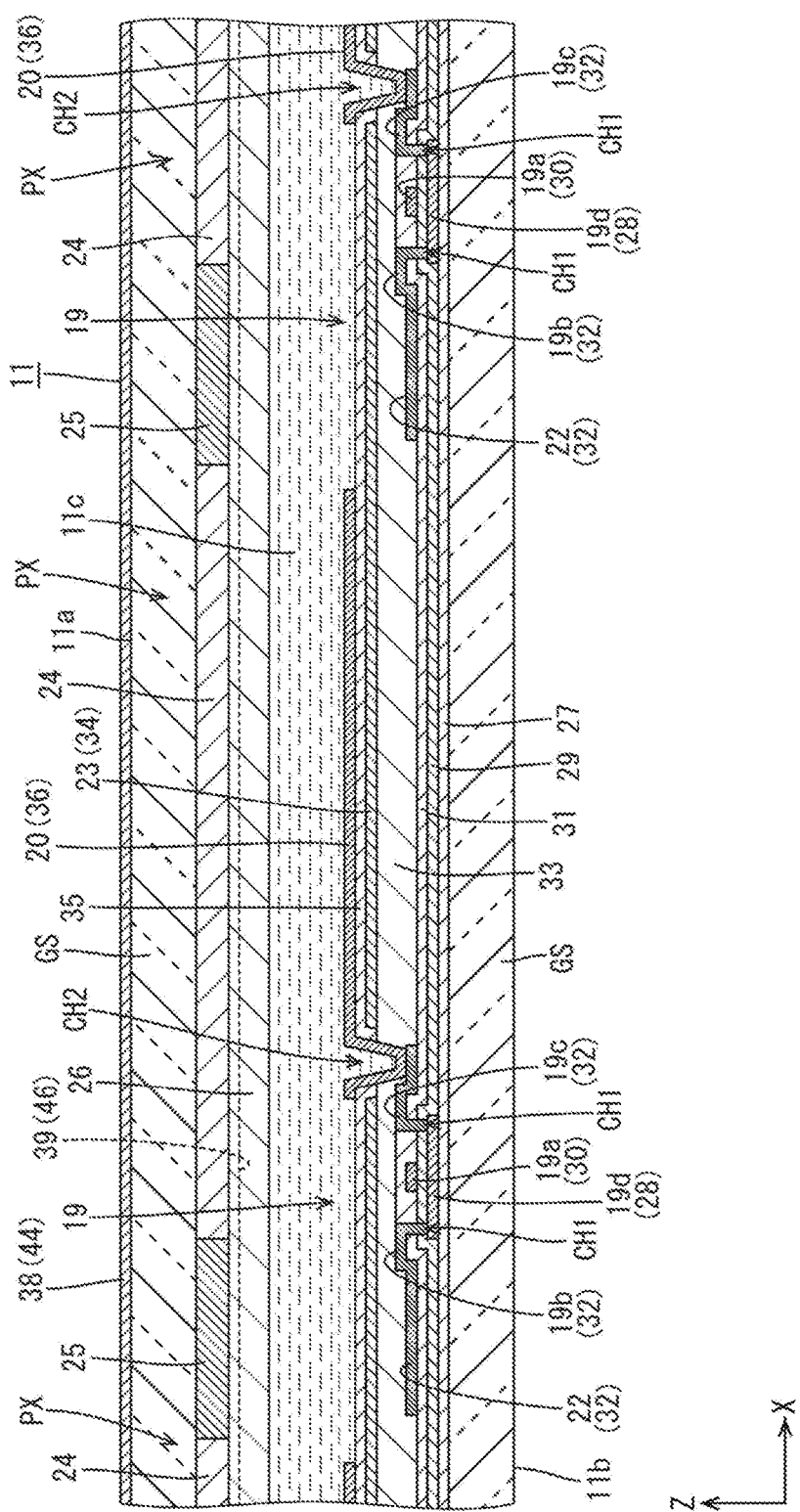
FIG. 7 is a cross-sectional view along line vii-vii in FIG. 6.

As illustrated in FIGS. 2 and 7, the liquid crystal panel 11 includes a pair of boards 11a and 11b and a liquid crystal layer 11c (liquid crystals) between the boards 11a and 11b. The liquid crystal layer 11c contains liquid crystal molecules that are substances having optical characteristics that change according to application of an electric field. The boards 11a and 11b are bonded together with a sealing member, which is not illustrated, with a gap corresponding to a thickness of the liquid crystal layer 11c maintained therebetween. One of the boards 11a and 11b on the front side is the CF board 11a (a common board) and the other on the rear side (back side) is the array board 11b (a component board, an active matrix board). The CF board 11a and the array board 11b include substantially transparent glass substrates GS (having high light transmissivity) and various films formed on the glass substrates GS by a known photolithography method. As illustrated in FIG. 2, the CF board 11a has a short dimension about equal to a short dimension of the array board 11b and a long dimension smaller than a long dimension of the array board 11b. The CF board 11a is bonded to the array board 11b with one of ends of the CF board 11a with respect to the long-side direction (on the upper side in FIG. 2) is aligned with a corresponding end of the array board 11b. A predefined area of the other end of the array board 11b with respect to the long-side direction (on the lower side in FIG. 2) does not overlap the CF board 11a. A front plate surface and a rear plate surface of the predefined area of the array board 11b are exposed to the outside. The predefined area includes the mounting area for mounting the driver 16 and the flexible circuit board 17. Alignment films (not illustrated) for adjustment of orientations of the liquid crystal molecules in the liquid crystal layer 11c are formed to directly face the liquid crystal layer 11c. Polarizing plates (not illustrated) are attached to outer surfaces of the boards 11a and 11b.

Figure 6:
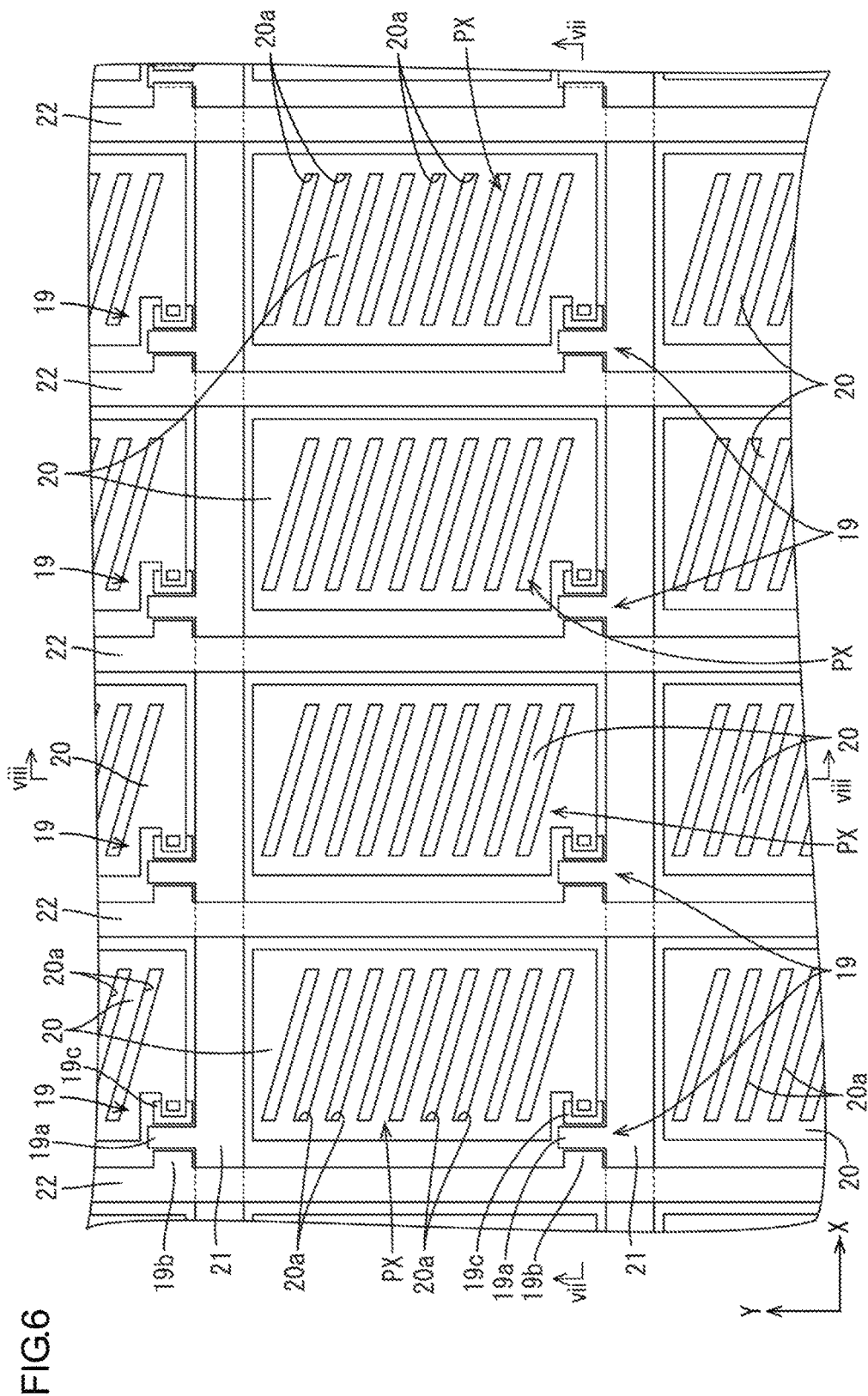
FIG. 6 is a magnified plan view of a central portion of the array board.

Configurations of portions of the array board 11b and the CF board 11a in the display area AA will be briefly described. As illustrated in FIGS. 6 and 7, thin film transistors (TFTs, display components) 19 and pixel electrodes 20 are arranged in a matrix in an area of an inner surface of the array board 11b (on a liquid crystal layer 11c side, on an opposed surface side opposed to the CF board 11a) in the display area AA. The TFTs are switching components. Gate lines 21 and source lines 22 are routed in a grid to surround the TFTs 19 and the pixel electrodes 20. The TFTs 19 and the pixel electrodes 20 are arranged at intersections of the gate lines 21 and the source lines 22 routed in the grid to form the matrix. The gate lines 21 are connected to gate electrodes 19a of the TFTs 19 and the source lines 22 are connected to source electrodes 19b of the TFTs 19. The pixel electrodes 20 are connected to drain electrodes 19c of the TFTs 19. The TFTs 19, the pixel electrodes 20, the gate lines 21, and the source lines 22 are included in a display circuit that is a circuit for displaying images. A detailed configuration of the TFTs 19 will be described later. Each pixel electrode 20 has a vertically-long rectangular shape in a plan view. The array board 11b includes common electrodes 23. Electric fields are produced between the pixel electrodes 20 and the common electrodes 23 when a common potential (a reference potential) is applied to the common electrodes 23. Namely, the liquid crystal panel 11 according to this embodiment operates in fringe field switching (FFS) mode that is an improved mode of an in-plane switching (IPS) mode. The array board 11b includes the pixel electrodes 20 and the common electrodes 23 that are formed in different layers. Each pixel electrode 20 includes slits 20a formed at intervals to extend in a slanting direction relative to the X-axis direction and the Y-axis direction in a plan view. With the slits 20a, when a potential difference is produced between the pixel electrode 20 and the common electrode 23 that are formed in the different layer, a fringe electric field (an oblique electric field) including a component along a plate surface of the array board 11b and a component along a direction normal to the plate surface of the array board 11b is applied. Orientations of the liquid crystal molecules in the liquid crystal layer 11c can be properly adjusted using the fringe electric field.

As illustrated in FIG. 7, the CF board 11a includes color filters 24 formed in an area of an inner surface of the CF board 11a (on the liquid crystal layer 11c side, on an opposed side opposed to the array board 11b) in the display area AA. The color filters 24 include red (R), green (G), and blue (B) color portions arranged in a matrix to overlap the pixel electrodes 20 of the array board 11b in a plan view. A light blocking portion 25 (a black matrix) is formed in a grid to extend among the color portions of the color filters 24 for reducing color mixture. The light blocking portion 25 are arranged to overlap the gate lines 21 and the source lines 22 in the plan view. A planarization film 26 (a protective film, an overcoat film) is formed on surfaces of the color filters 24 and the light blocking portion 25. In the liquid crystal panel 11, one display pixel, which is a unit of image display, includes three color portions of red (R), green (G), and blue (B) and three pixel electrodes 20 opposed to the color portions. Each display pixel includes three pixel portions PX of R, and B. Each pixel portion PX includes the pixel electrode 20 and the color portion opposed to the pixel electrode 20. The pixel portions PX are repeatedly arranged within a plate surface of the liquid crystal panel 11 along the row direction (the X-axis direction). Lines of the pixel portions PX are arranged along the column direction (the Y-axis direction). The light blocking portion 25 is arranged to separate the adjacent pixel portions PX from each other.

Next, a configuration of the various films formed in layers on the inner surface side of the array board 11b by the known photolithography method will be described in detail The configuration includes a sequence of the layers. The array board 11b mainly includes components for performing a function for displaying images (a display function), which is one of functions of the liquid crystal panel 11. Specifically, as illustrated in FIG. 7, the array board 11b includes a basecoat film 27, a semiconductor film 28, a gate insulating film 29 (an inorganic insulating film), a first metal film 30 (a gate metal film), a first interlayer insulating film 31 (an inorganic insulating film), a second metal film 32 (a source metal film), a planarization film 33 (an organic insulating film), a first transparent electrode film 34, a second interlayer insulating film 35 (an inorganic insulating film), and a second transparent electrode film 36 in this sequence from a lower layer side (a glass substrate GS side, the rear side). Although not illustrated, the alignment film is formed over the second interlayer insulating film 35 and the second transparent electrode film 36.

The basecoat film 27 is formed in a solid pattern to cover an entire surface of the glass substrate GS of the array board 11b. The basecoat film 27 is made of silicon oxide (SiO2), silicon nitride (SiNx), or silicon oxide nitride. The semiconductor film 28 is formed over the basecoat film 27 and in a pattern to be arranged in the display area AA and the non-display area NAA. The semiconductor film 28 is formed in an island pattern that corresponds to arrangement of the TFTs 19, which will be described later, at least in the display area AA. The semiconductor film 28 is formed from continuous grain (CG) silicon thin film, which is a kind of silicon thin films having polycrystalline structures (polycrystalline silicon thin films). The CG silicon thin film may be formed by adding a metal material to the amorphous silicon thin film and by performing thermal processing at low temperature of 550° C. or lower for a short period. Therefore, atomic arrangement at crystal grain boundaries of silicon crystals has continuity. The gate insulating film 29 is formed above the basecoat film 27 and the semiconductor film 28 in a solid pattern across the display area AA and the non-display area NAA. The gate insulating film 29 may be made of silicon oxide (SiO2).

The first metal film 30 is formed above the gate insulating film 29 and in a pattern to be arranged in the display area AA and the non-display area NAA. The first metal film 30 may be formed from a multilayer film of titanium (Ti) and copper (Cu). The gate lines 21 and the gate electrodes 19a are formed from the first metal film 30. The first interlayer insulating film 31 is formed above the gate insulating film 29 and the first metal film 30. The first interlayer insulating film 31 is formed in a solid pattern across the display area AA and the non-display area NAA. The first interlayer insulating film 31 may be made of silicon oxide (SiO2). Intersections between the gate lines 21 and the source lines 22 are insulated with the first interlayer insulating film 31. The second metal film 32 is formed above the first interlayer insulating film 31. The second metal film 32 is formed in a pattern to be arranged in the display area AA and the non-display area NAA. The second metal film 32 may be formed from a multilayer film of titanium (Ti) and copper (Cu). The source lines 22, the source electrodes 19b, and the drain electrodes 19c are formed from the second metal film 32. The planarization film 33 is formed above the first interlayer insulating film 31 and the second metal film 32. The planarization film 33 is formed in a solid pattern across the display area AA and the non-display area NAA. The planarization film 33 may be made of acrylic resin such as polymethylmethacrylate (PMMA). The planarization film 33 has a thickness larger than thicknesses of the insulating films 29, 31, and 35, which are inorganic insulating films. Therefore, the planarization film 33 properly planarizes a surface of the array board 11b on the liquid crystal layer 11c side (on which the alignment film is formed).

The first transparent electrode film 34 is formed above the planarization film 33. The first transparent electrode film 34 is formed in a substantially solid pattern at least in the display area AA. The first transparent electrode film 34 may be made of transparent electrode material such as indium tin oxide (ITO) and zinc oxide (ZnO). The common electrodes 23 in a substantially solid pattern are formed from the first transparent electrode film 34. The second interlayer insulating film 35 is formed above the planarization film 33 and the first transparent electrode film 34. The second interlayer insulating film 35 is formed in a solid pattern across the display area AA and the non-display area NAA. The second interlayer insulating film 35 may be made of silicon nitride (SiNx). The second transparent electrode film 36 is formed above the second interlayer insulating film 35. The second transparent electrode film 36 is formed in an island pattern that corresponds to the arrangement of the TFTs 19 in the display area AA. The second transparent electrode film 36 may be made of transparent electrode material such as indium tin oxide (ITO) and zinc oxide (ZnO). The pixel electrodes 20 are formed from the second transparent electrode film 36. The gate insulating film 29, the first interlayer insulating film 31, the planarization film 33, and the second interlayer insulating film 35 include holes. The holes include contact holes CH1 and CH2 that are formed at predefined positions by patterning in the production process of the array board 11b.

As illustrated in FIG. 7, each TFT 19 of the array board 11b in the display area AA includes a channel 19d, the gate electrode 19a, the source electrode 19b, and the drain electrode 19c. The channel 19d is formed from the semiconductor film 28. The gate electrode 19a is over the channel 19d with the gate insulating film 29 therebetween. The source electrode 19b and the drain electrode 19c are above the gate electrode 19a with the first interlayer insulating film 31 between the gate electrode 19a and the source electrode 19b or the drain electrode 19c. The TFTs 19 are top-gate (staggered-type) transistors. Each source electrode 19b and each drain electrode 19c are connected to the corresponding channel 19d through the contact holes CH1 that are formed in the gate insulating film 29 and the first interlayer insulating film 31. According to the configuration, electrons can be movable between the source electrode 19b and the drain electrode 19c. The semiconductor film 28 that forms the channel 19d is formed from the CG silicon thin film. The CG silicon thin film has electron mobility of, for example, 200 to 300 cm2/Vs, which is higher than electron mobility of an amorphous silicon thin film. Therefore, by forming the channel 19d of the TFT 19 from the semiconductor film 28 formed from the CG silicon thin film, the size of the TFT 19 can be reduced and the amount of transmitting light through the semiconductor film 28 can be maximized. This configuration is preferable for improving definition and reducing power consumption. Each pixel electrode 20 that is formed from the second transparent electrode film 36 is connected to the drain electrode 19c of the corresponding TFT 19 via the contact holes CH2 that are formed in the planarization film 33 and the second interlayer insulating film 35. When the gate electrode 19a of the TFT 19 is conducted, a current flows between the source electrode 19b and the drain electrode 19c via the channel 19d and a predefined potential is applied to the pixel electrode 20. The common electrodes 23 that are formed from the first transparent electrode film 34 overlap the respective pixel electrodes 20 in a plan view with the second interlayer insulating film 35 therebetween.

As described earlier, the common electrodes 23 that are formed in the solid pattern includes holes at positions that correspond to the contact holes CH2 in the planarization film 33 and the second interlayer insulating film 35 in the plan view for passing contact portions of the pixel electrodes 20.

Figure 3:
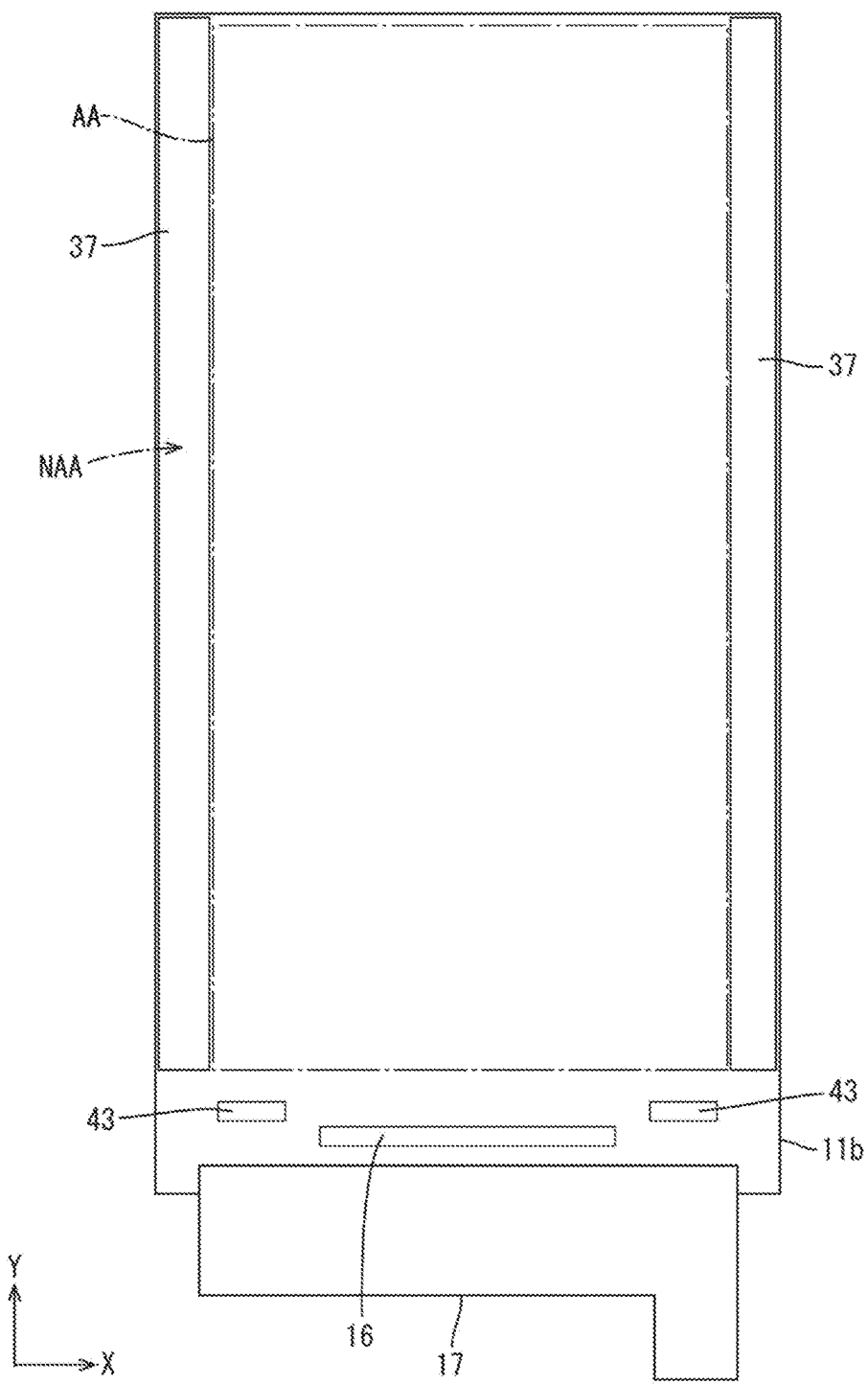
FIG. 3 is a plan view of an array board included in the liquid crystal panel.

Next, a configuration of portions of the array board 11b in the non-display area NAA will be described. As illustrated in FIG. 3, monolithic circuits 37 (a component driver portion) are arranged in the portions of the array board 11b in the non-display area NAA adjacent to the display area AA with respect to the X-axis direction (the short-side direction of the liquid crystal panel 11). The monolithic circuits 37 and the TFTs 19 are included in a display circuit. A pair of the monolithic circuits 37 is arranged such that the monolithic circuits 37 sandwich the display area AA with respect to the X-axis direction. The monolithic circuits 37 are formed in areas that extend for about an entire length of the display area AA along the Y-axis direction. The monolithic circuits 37 are connected to the gate lines 21 that are routed out of the display area AA and configured to perform control for supplying output signals of the driver 16 to the TFTs 19 Each monolithic circuit 37 is monolithically formed on the array board 11b with the semiconductor film 28 as a base. The semiconductor film 28 is the film used for the TFTs 19 in the display area AA. The monolithic circuits 37 include control circuits for controlling supply of signals to the TFTs 19 and components of the control circuits. The components of the control circuits include circuit TFTs (circuit thin film transistors) which use the semiconductor film 28 as channels. The circuit TFTs are not illustrated. The control circuits include circuit lines that are formed from the first metal film 30 and the second metal film 32. The monolithic circuits 37 include scan circuits for supplying scan signals that are included in the output signals of the driver 16 to the gate lines 21 at predefined timing to scan the gate lines 21 in sequence. The monolithic circuit 37 may include an auxiliary circuit such as a level shifter circuit or an ESD protection circuit. The monolithic circuits 37 are connected to the driver 16 with connecting lines, which are not illustrated, formed on the array board 11b.

Figure 4:
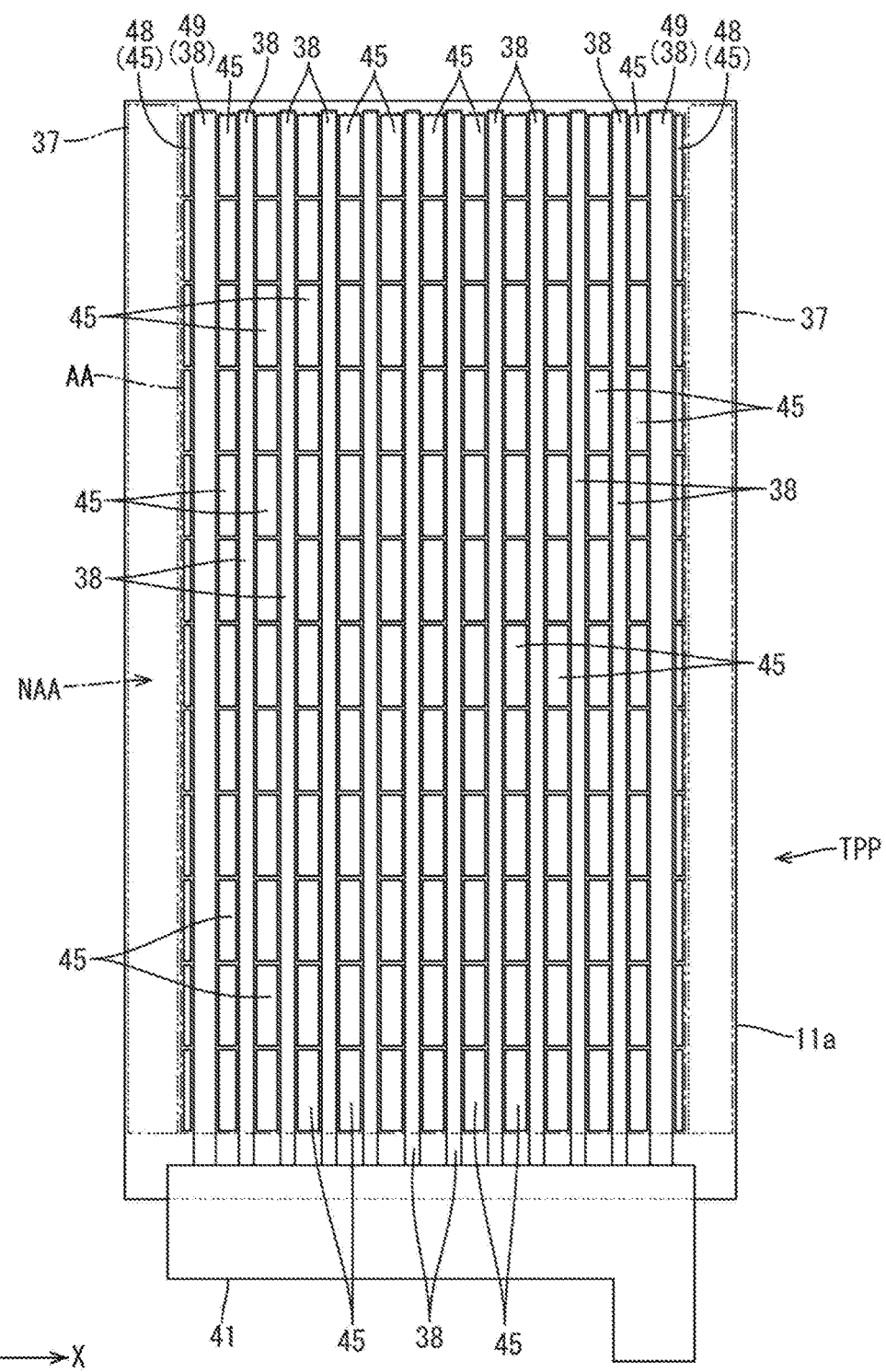
FIG. 4 is a plan view of a CF board included in the liquid crystal panel.
Figure 5:
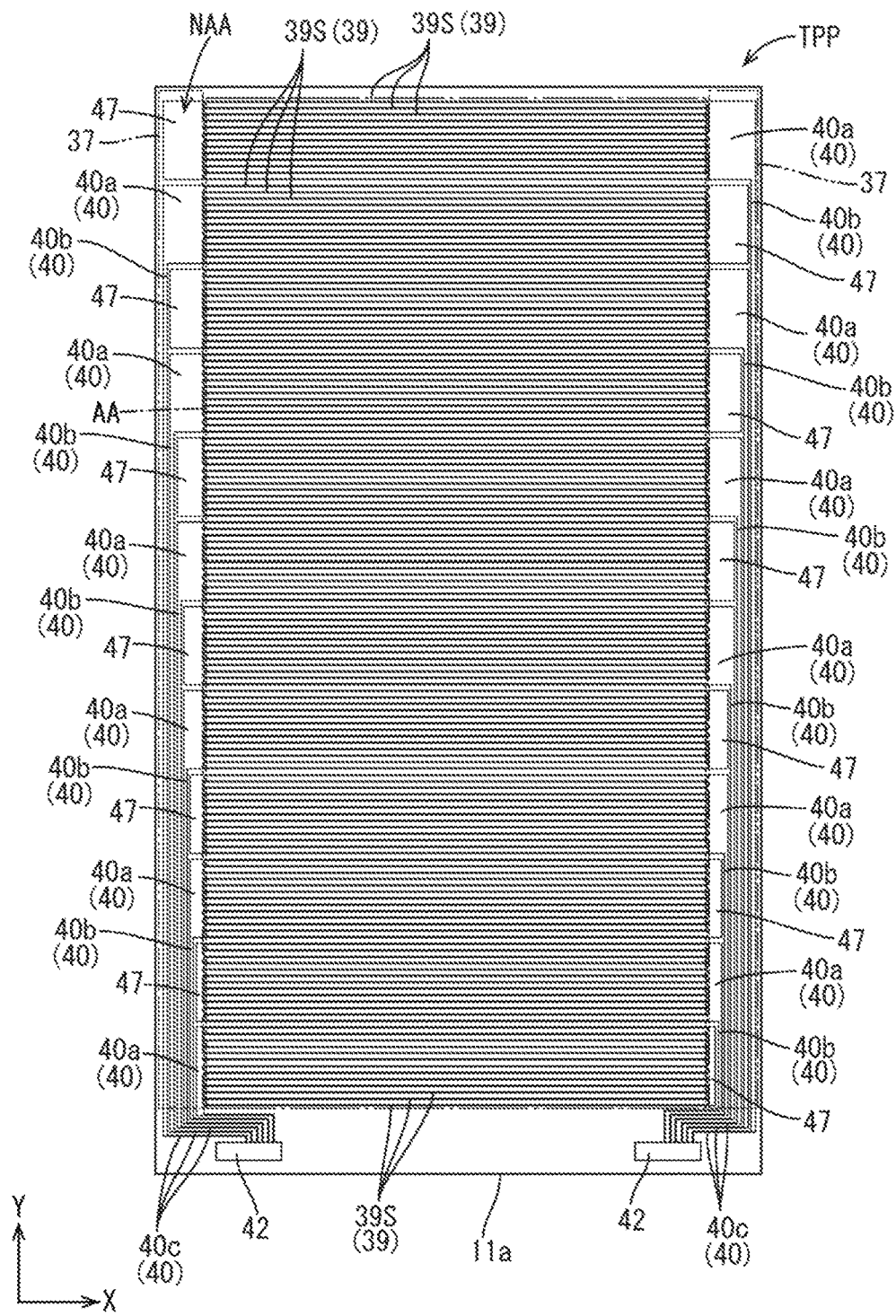
FIG. 5 is a bottom view of the CF board included in the liquid crystal panel.

As described earlier, the liquid crystal panel 11 according to this embodiment includes the display function and the position inputting function. The display function is for image display. The position inputting function is for detecting position information, which is input by the user, based on a displayed image. The liquid crystal panel 11 includes a touchscreen pattern TPP (a position inputting device) for performing the position inputting function. The touchscreen pattern TPP is embedded in the liquid crystal panel 11 (with the in-cell technology). The touchscreen pattern TPP uses the projection-type capacitive touchscreen technology, that is, a mutual capacitive detection method. The touchscreen pattern TPP is included only in the CF board 11a. Specifically, as illustrated in FIGS. 4 and 5, the touchscreen pattern TPP includes at least detection electrodes 38 (first position detection electrodes, receiving electrodes) and drive electrodes 39 (second position detection electrodes, transmitting electrodes). The detection electrodes 38 are arranged on an outer surface side of the CF board 11a (on the side opposite from the liquid crystal layer 11c side, the front side, a display surface side) and the drive electrodes 39 are arranged on an inner surface side of the CF board 11a (on the liquid crystal layer 11c side, the rear side, the side opposite from a display surface side). With the touchscreen pattern TPP, whether or not an input of position information (touch operation) is present is detected based on a difference in capacitance between when an object (e.g., a finger of the user) which interrupts an electric field between the detection electrode 38 and the drive electrode 39 is present and when the object is not present. The detection electrodes 38 and the drive electrodes 39 included in the touchscreen pattern TPP are arranged in the portion of the CF board 11a within the display area AA. The display area AA of the liquid crystal panel 11 substantially corresponds with a touch area in which input positions are detectable. The non-display area NAA substantially corresponds with a non-touch area in which input positions are not detectable. In the edge areas at the ends with respect to the short-side direction (the X-axis direction) which corresponds to the non-touch area of the inner surface of the CF board 11a (the non-display area NAA), position detection line portions 40 are formed. The position detection line portions 40 are connected to the drive electrodes 39 for transmitting signals to the drive electrodes 39.

A touchscreen flexible circuit board 41 is connected to the end portion at an end with respect to the long-side direction (the Y-axis direction) which corresponds to the non-touch area of the outer surface of the CF board 11a (the end portion on the lower side in FIGS. 4 and 5). The touchscreen flexible circuit board 41 is for transmitting signals between the touchscreen controller, which is not illustrated, and the detection electrodes 38. The touchscreen flexible circuit board 41 overlaps the flexible circuit board 17 connected to the liquid crystal panel 11 in the plan view. The flexible circuit board 17 is for image display. The CF board 11a includes a pair of CF board-side contacts 42 (a signal supplying portion, a common board-side signal supplying portion) in the non-touch area of the inner surface of the CF board 11a overlapping the touchscreen flexible circuit board 41. The CF board-side contacts 42 are connected to ends of the position detection line portions 40 opposite from ends connected to the drive electrodes 39. The array board 11b includes a pair of array board-side contacts 43 (a component board-side signal supplying portion) in the non-touch area of the inner surface of the array board 11b. The array board-side contact 43 overlaps the CF board-side contacts 42. The array board-side contacts 43 are electrically connected to the CF board-side contacts 42. The array board-side contacts 43 are connected to the driver 16 via connecting lines, which are not illustrated, formed on the inner surface of the array board 11b. The signals from the touchscreen controller, which is not illustrated, are sequentially transmitted to the drive electrodes 39 via the flexible circuit board 17, the driver 16, the array board-side contacts 43, the CF board-side contacts 42, and the position detection line portions 40. The CF board-side contacts 42 and the array board-side contacts 43 overlap the seating member (not illustrated) for sealing the liquid crystal layer 11c in the plan view and are electrically connected to each other via conductive grains that are contained in the sealing member.

Figure 9:
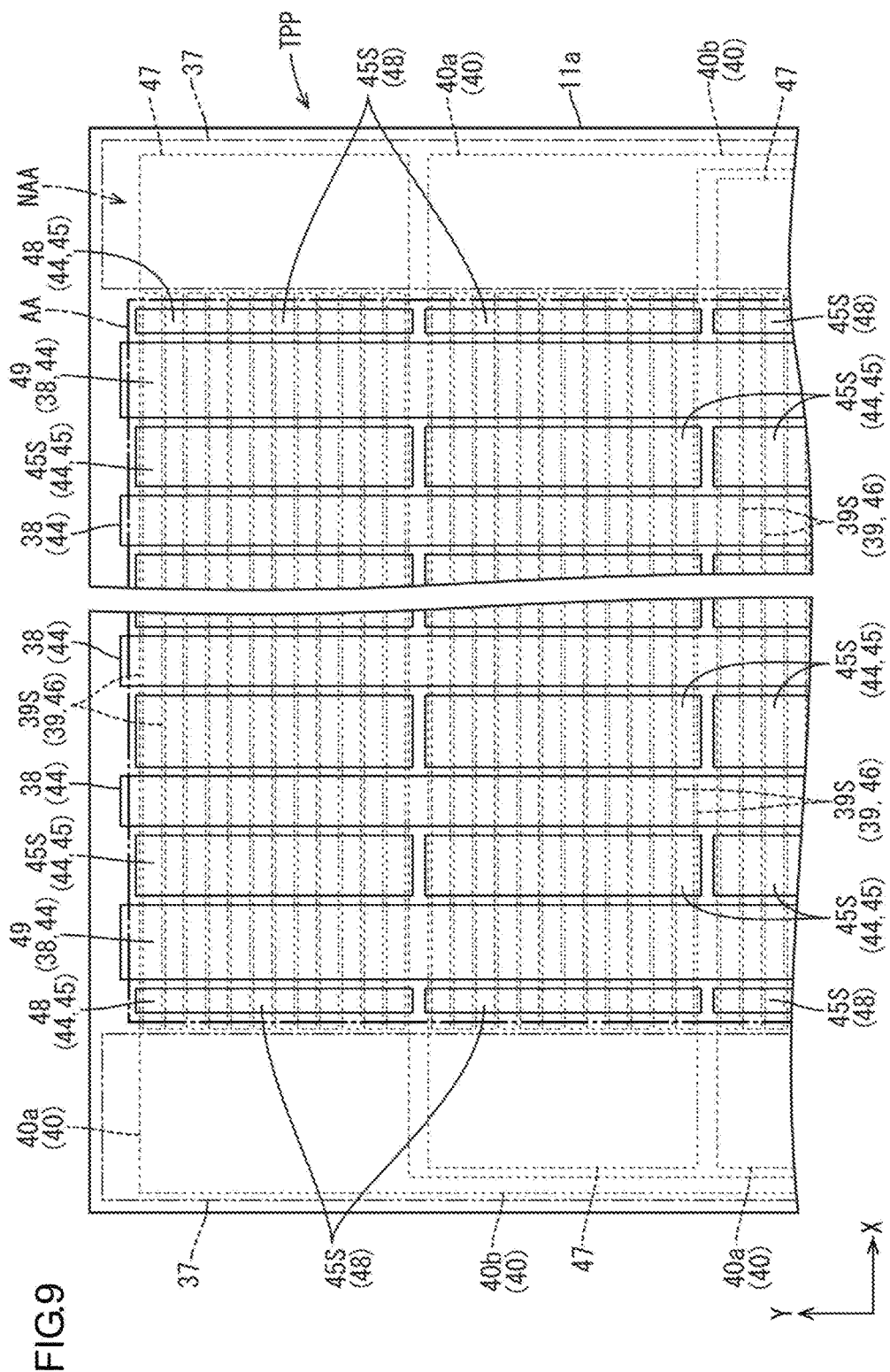
FIG. 9 is a magnified plan view of portions of the CF board at ends with respect to a short-side direction.

As illustrated in FIGS. 4 and 9, each of the detection electrodes 38 is formed on the outer surface of the CF board 11a to extend along the long-side direction of the display area AA, that is, the Y-axis direction (a first direction). The detection electrode 38 has a vertically-long rectangular two-dimensional shape. The detection electrodes 38 are formed from a transparent electrode film 44 that is made of transparent electrode material such as indium tin oxide (ITO) and zinc oxide (ZnO) similar to the pixel electrodes 20 and the common electrodes 23. Therefore, the detection electrodes 38 are less likely to be recognized by the user although the detection electrodes 38 are arranged in the portion of the CF board 11a within the display area AA. Each detection electrode 38 has a length larger than a length of a floating electrode 45, which will be described later, and further larger than a length of the display area AA. An end of the detection electrode 38 (on the lower side in FIG. 4) reaches the non-display area NAA. The end of the detection electrode 38 is connected to the touchscreen flexible circuit board 41. The detection electrode 38 has a width larger than a dimension of the display pixel (the pixel portion PX) with respect to the X-axis direction and thus the detection electrode 38 crosses multiple display pixels (pixel portions PX) (see FIG. 7). Specifically, the width of the detection electrode 38 is about some millimeters, that is, significantly larger than the dimension of the display pixel (the pixel portion PX) with respect to the X-axis direction, which is about some hundreds micrometers.

As illustrated in FIGS. 4 and 9, the detection electrodes 38 (twelve of them in FIG. 4) are arranged at intervals with respect to the short-side direction, that is, the X-axis direction (the second direction, a direction in which the detection electrodes 38 are arranged) on the outer surface of the CF board 11a in the display area AA. The intervals of the detection electrodes 38 arranged with respect to the X-axis direction are equal to each other, that is, the detection electrodes 38 are arranged at equal intervals. Floating electrodes 45 are arranged adjacent to the detection electrodes 38, respectively, with respect to the X-axis direction in a plan view on the outer surface of the CF board 11a within the display area AA. Some of the floating electrodes 45 are arranged between the detection electrodes 38 that are adjacent to each other with respect to the X-axis direction. Other floating electrodes 45 are closer to the edges than the detection electrodes 38 at the outermost with respect to the X-axis direction. The floating electrodes 45 are physically and electrically isolated from the detection electrodes 38 such that the floating electrodes 45 form an islands pattern. The floating electrodes 45 and at least the adjacent detection electrodes 38 with respect to the X-axis direction form capacitors. The floating electrodes 45 that are sandwiched between the detection electrodes 38 adjacent to each other with respect to the X-axis direction and the detection electrodes 38 on the right and the left of the floating electrodes 45 with respect to the X-axis direction form capacitors. The floating electrodes 45 on the outermost with respect to the X-axis direction and the detection electrodes 38 at the outermost with respect to the X-axis direction form capacitors. The floating electrodes 45 are formed from the transparent electrode film 44 that forms the detection electrodes 38 in the same layer as the detection electrodes 38 on the outer surface of the CF board 11a. To form the floating electrodes 45 and the detection electrodes 38, the transparent electrode film 44 is formed in the solid pattern on the outer surface of the CF board 11a and patterned. Through the process, the floating electrodes 45 and the detection electrodes 38 that are electrically independent from each other are formed. With the floating electrodes 45, the light transmissivity in areas between the detection electrodes 38 adjacent to each other with respect to the X-axis direction is about equal to the light transmissivity in the areas in which the detection electrodes 38 are arranged. Therefore, the detection electrodes 38 are less likely to be recognized by the user.

As illustrated in FIG. 9, the floating electrodes 45 adjacent to the detection electrodes 38 with respect to the X-axis direction include segment floating electrodes 45S separated from one another in the Y-axis direction to overlap the drive electrodes 39, respectively. Each of the segment floating electrodes 45S (segment first floating electrodes) has a vertically-long rectangular two-dimensional shape. A long dimension of each segment floating electrode 45S (a dimension in the Y-axis direction) is smaller than the long dimension of each detection electrode 38 and about equal to a width of the drive electrode 39 (a dimension in the Y-axis direction), which will be described later. The segment floating electrodes 45S are arranged to overlap the drive electrodes 39 that are arranged along the Y-axis direction in the plan view. According to the configuration, the segment floating electrodes 45S and the overlapping drive electrodes 39 form capacitors, respectively. Therefore, the segment floating electrodes 45S are less likely to be affected by the potentials of the drive electrodes 39 other than the overlapping drive electrodes 39. The number of the segment floating electrodes 45S of each floating electrode 45 (the number of segmentations of the floating electrode 45) is equal to the number of drive electrodes 39 that are arranged along the Y-axis direction.

Figure 10:
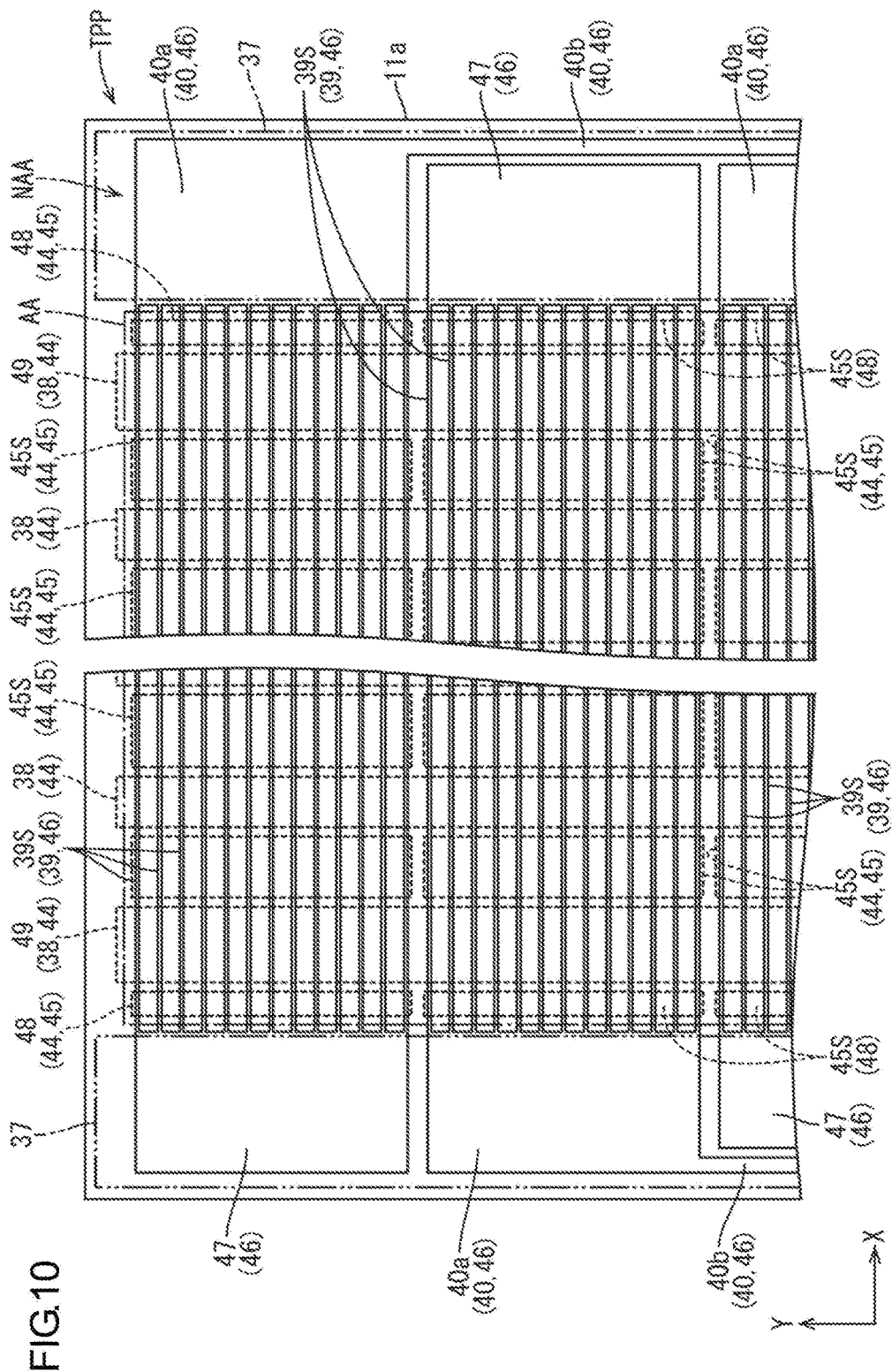
FIG. 10 is a magnified bottom view of the portions of the CF board at the ends with respect to the short-side direction at an end with respect to a long-side direction opposite from a terminal portion side.

As illustrated in FIGS. 5 and 10, the drive electrodes 39 extend along the X-axis direction (the second direction) perpendicular to the Y-axis direction (the first direction) in which the detection electrodes 38 extend inside the inner surface of the CF board 11a within the display area AA. Each drive electrode 39 has a length about equal to the short dimension of the display area AA and a width larger than the width of the detection electrode 38. The drive electrodes 39 are arranged along the Y-axis direction (the first direction, a direction in which the drive electrodes 39 are arranged) perpendicular to the extending direction of the drive electrodes 39 within the inner surface of the CF board 11a in the display area AA. Intervals of the drive electrodes 39 with respect to the Y-axis direction are equal to each other. Namely, the drive electrodes 39 are arranged at equal intervals. Portions of the drive electrodes 39 cross the detection electrodes 38 and the floating electrodes 45 in the plan view. The portions of the drive electrodes 39 are opposed to portions of the detection electrodes 38 and the floating electrodes 45 with the glass substrate GS of the CF board 11a therebetween. The portions of the drive electrodes 39 and portions of the detection electrodes 38 form capacitors, and the portions of the drive electrodes 39 and the floating electrodes 45 form capacitors. The drive electrodes 39 are formed from a metal film 46 having the conductivity higher than the transparent electrode film 44 that forms the detection electrodes 38 and the floating electrodes 45 and thus the wire resistances are reduced. The metal film 46 that forms the drive electrodes 39 is made of metal material such as aluminum, molybdenum, titanium, tungsten, copper, silver, and gold. The metal film 46 that forms the drive electrode 39 forms CF board-side contacts 42.

Figure 8:
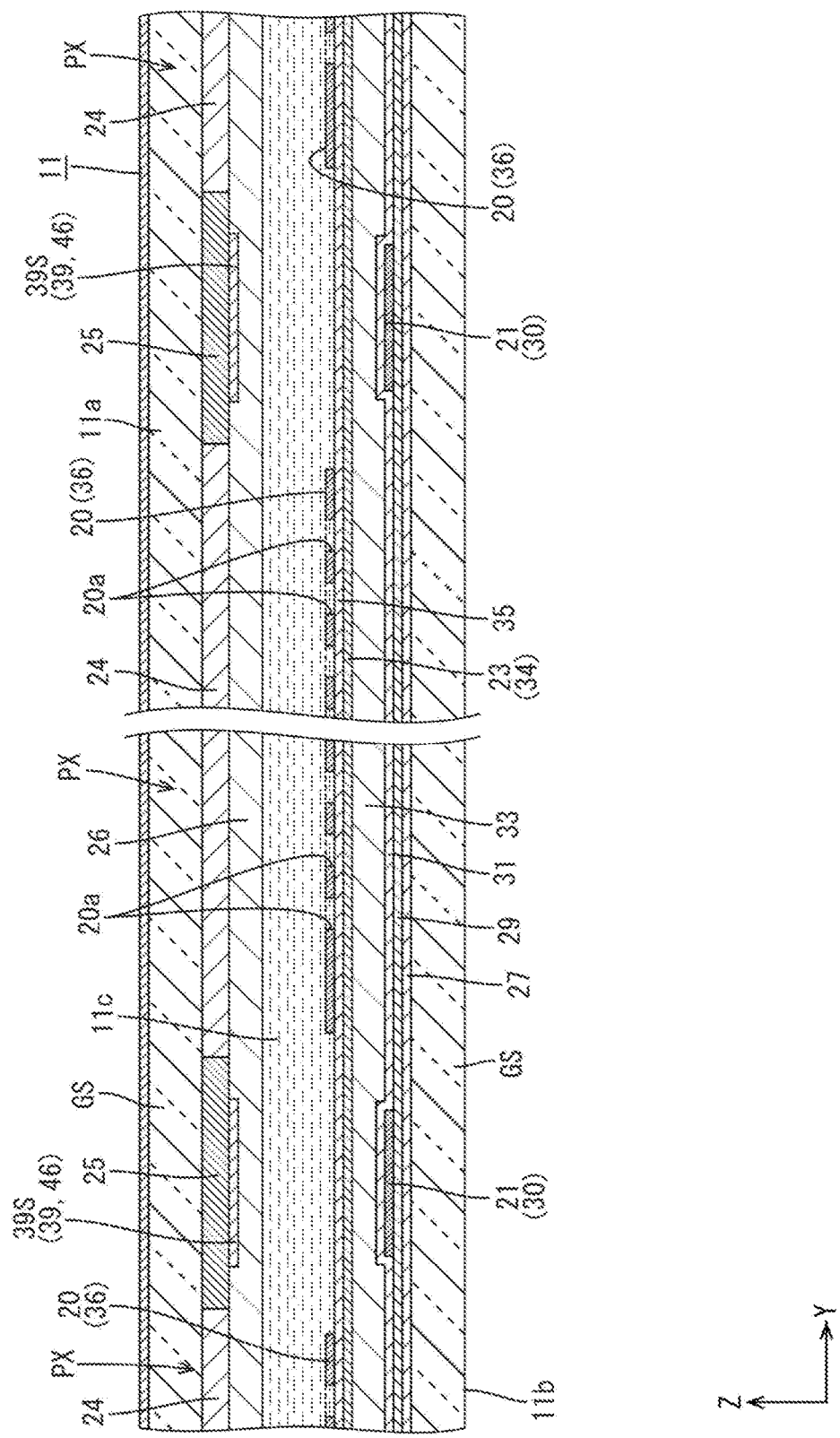
FIG. 8 is a cross-sectional view along line viii-viii in FIG. 6.
Figure 12:
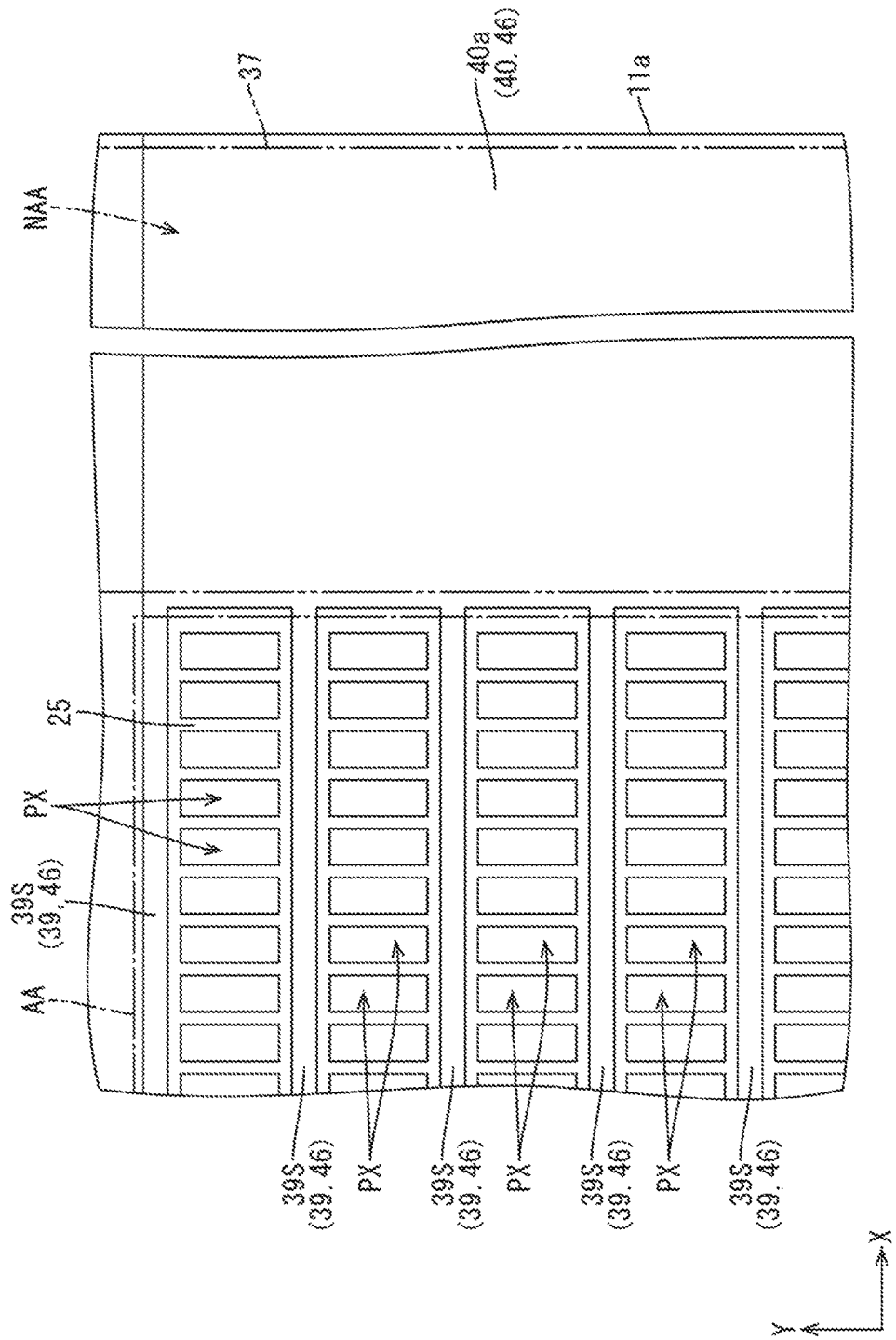
FIG. 12 is a magnified bottom view of the portion of the CF board at the end with respect to the short-side direction at an end with respect to the long-side direction on the terminal portion side.

The metal film 46 that forms the drive electrode 39 has high conductivity but very low light transmissivity. Therefore, the drive electrodes 39 of the CF board 11a in the display area AA may be recognized by the user. As illustrated in FIGS. 8 and 12, the drive electrodes 39 include segment drive electrodes 39S (segment second position detection electrodes, unit drive electrodes, branch drive electrodes) which are separated from one another. The segment drive electrodes 39S are arranged to overlap sections of the light blocking portion 25 of the CF board 11a in the plan view. The segment drive electrodes 39S of the drive electrodes 39 extend along the X-axis direction (the second direction). The segment drive electrodes 39S are arranged over sections of the light blocking portion 25 which extend along the X-axis direction (on the array board 11b side, the liquid crystal layer 11c side, a side opposite from the glass substrate GS side). Because the drive electrodes 39 are hidden from the user with the light blocking portion 25, ambient light is less likely to be reflected by the drive electrodes 39 and the drive electrodes 39 are less likely to be recognized by the user. The segment drive electrodes 39S are arranged at intervals with respect to the Y-axis direction (the first direction). The intervals are about equal to the intervals of the gate lines 21 arranged in the Y-axis direction (the intervals of the pixel portions PX with respect to the Y-axis direction, the length of the pixel electrodes 20). The segment drive electrodes 39S are arrange to overlap the gate lines 21 in the plan view. The segment drive electrodes 39S of the drive electrodes 39 has the width slightly smaller than the width of the portions of the light blocking portion 25 which extend in the X-axis direction. Even if relative positions of the light blocking portion 25 and the drive electrodes 39 are shifted during patterning in the production process of the CF board 11a, the segment drive electrodes 39S and the light blocking portion 25 are more likely to overlap each other. The width of the segment drive electrodes 39S are smaller than the width of the detection electrodes 38.

As illustrated in FIGS. 5 and 10, the position detection line portions 40 are routed such that a first end of each position detection line portion 40 is connected to one end of the drive electrode 39. A second end of the position detection line portion 40 is connected to the CF board-side contact 42. A large portion of the position detection line portion 40 extends along the Y-axis direction (the first direction) perpendicular to the extending direction of the drive electrode 39. Specifically, each position detection line portion 40 includes a first line 40a, a second line 40b, and a third line 40c. The first line 40a is connected to one end of the drive electrode 39. The second line 40b extends from the first line 40a along the Y-axis direction. The third line 40c has a planar shape that includes a bent portion to extend from the second line 40b to the CF board-side contact 42. The width of the position detection line portion 40 decreases in stepwise as approaching from the drive electrode 39 to the CF board-side contact 42. The width of the first line 40a is about equal to the width of the drive electrode 39 and the width of the second line 40b is smaller than the width of the first line 40a. The width of the third line 40c is smaller than the width of the second line 40b. The position detection line portion 40 extends from the corresponding drive electrode 39 to the CF board-side contact 42. Therefore, the position detection line portion 40 closer to the CF board-side contact 42 has a smaller length and the position detection line portion 40 farther from the CF board-side contact 42 has a larger length.

The position detection line portions 40 are formed from the metal film 46 that forms the drive electrodes 39 and arranged in the same layer as the drive electrodes 39 on the inner surface of the CF board 11a. Because the position detection line portions 40 are formed from the metal film 46, the wire resistances are sufficiently low. Therefore, the signals transmitted to the drive electrodes 39 are less likely to become dull. The position detection line portions 40 are formed from the metal film 46 and thus less likely to have light transmissivity. However, the position detection line portions 40 are arranged on the CF board 11a in the non-display area NAA. Therefore, the display quality is less likely to be subject to adverse effect.

As illustrated in FIGS. 5 and 10, the position detection line portions 40 are arranged to sandwich the drive electrodes 39 in the direction in which the drive electrodes 39 extend. Namely, the position detection line portions 40 are arranged in the non-display areas NAA (non-touch areas) on the right side and the left side of the display area AA (the touch area) with respect to the X-axis direction. The position detection line portions 40 are arranged to overlap the monolithic circuits 37 on the array board 11b in the non-display areas NAA in the plan view. Even if noise is generated from the monolithic circuits 37, the noise can be blocked by the multiple position detection line portions 40. Therefore, the position detection performances of the touchscreen pattern TPP are less likely to decrease. On one of sides with respect to the direction in which the drive electrodes 39 extend, the position detection line portions 40 that overlap one of the monolithic circuits 37 (e.g., one on the right in FIG. 5) are connected to first ends of the drive electrodes 39. On the other one of sides with respect to the direction in which the drive electrodes 39 extend, the position detection line portions 40 that overlap the other one of the monolithic circuits 37 (e.g., one on the left in FIG. 5) are connected to the second ends of the drive electrodes 39. The drive electrodes 39, the first ends of which are connected to one of the position detection line portions 40, and drive electrodes 39, the second ends of which are connected to the other of the position detection line portions 40, are alternately arranged along the Y-axis direction. More specifically, the drive electrodes 39 in odd lines from the CF board-side contact 42 with respect to the Y-axis direction are connected to the position detection line portions 40 on the other one of sides and the drive electrodes 39 in even lines are connected to the position detection line portions 40 on one of sides.

As illustrated in FIGS. 5 and 10, on the inner surface of the CF board 11a in the non-display area NAA, dummy lines 47 are formed adjacent to the ends of the drive electrodes 39 to which the position detection line portions 40 are not connected with respect to the X-axis direction. Each of the dummy lines 47 has a dimension in the Y-axis direction about equal to the width of the drive electrode 39 (a dimension in the Y-axis direction). The dummy lines 47 are provided for the drive electrodes 39 that are arranged along the X-axis direction, respectively. Specifically, some of the dummy lines 47 are arranged adjacent to the second ends of the drive electrodes 39 that are connected to the position detection line portions 40 on one of the sides and other dummy lines 47 are arranged adjacent to the first ends of the drive electrodes 39 that are connected to the position detection line portions 40 on the other one of the sides. Each dummy line 47 is arranged in an area defined by the drive electrodes 39 adjacent with respect to the X-axis direction and the second line 40b of the position detection line portion 40 adjacent to the dummy line 47 farther from the CF board-side contact 42 with respect to the Y-axis direction. The dummy line 47 has a dimension in the X-axis direction is smaller than a distance between the drive electrode 39 and the second line 40b that sandwich the dummy line 47. In comparison between the dummy line 47 closer to the CF board-side contact 42 and dummy line 47 farther from the CF board-side contact 42 with respect to the Y-axis direction, the dimension of the dummy line 47 closer to the CF board-side contact 42 in the X-axis direction is smaller than the dimension of the dummy line 47 farther from the CF board-side contact 42. The dummy lines 47 are formed from the metal film 46 that forms the drive electrodes 39 and the position detection line portions 40 in the same layer on the inner surface of the CF board 11a in which the drive electrodes 39 and the position detection line portions 40 are formed. It is preferable to set a distance between the dummy line 47 and the adjacent second line 40b in a range from 3 μm to 100 μm.

The dummy lines 47 are arranged to overlap the monolithic circuits 37 on the array board 11b in the non-display areas NAA in the plan view. Specifically, the dummy lines 47 adjacent to the first ends of the drive electrodes 39 and connected to the second ends of the position detection line portions 40 overlap one of the monolithic circuits 37 and the dummy lines 47 adjacent to the second ends of the drive electrodes 39 connected to the first ends of the position detection line portions 40 overlap the other one of the monolithic circuits 37 in the plan view. The dummy lines 47 (except for the farthest one from the CF board-side contact 42) are arranged to fill gaps between ends of the drive electrodes 39 opposite from the ends connected to the position detection line portions 40 and the second lines 40b of the position detection line portions 40 adjacent thereto with respect to the X-axis direction. The dummy lines 47 are connected to the ends of the adjacent drive electrodes 39 with respect to the X-axis direction, that is, the ends of the drive electrodes 39 which are not connected to the position detection line portions 40. Even if noise is produced from the monolithic circuits 37, the position detection line portions 40 and the dummy lines 47 block the noise with high efficiency. In the production process, the metal film 46 that forms the drive electrodes 39, the position detection line portions 40, the CF board-side contacts 42, and the dummy lines 47 is formed on the inner surface of the CF board 11a and patterned. Then, continuity inspection pads included in a continuity inspection apparatus may be applied to the CF board-side contacts 42 and the dummy lines 47 to pass currents. Whether or not defectives such as broken lines are present in the drive electrodes 39 and the position detection line portions 40 are determined. Namely, the dummy lines 47 can be used for the continuity inspection for the drive electrodes 39 and the position detection line portions 40. The dummy lines 47 do not contribute to the position inputting function.

Figure 11:
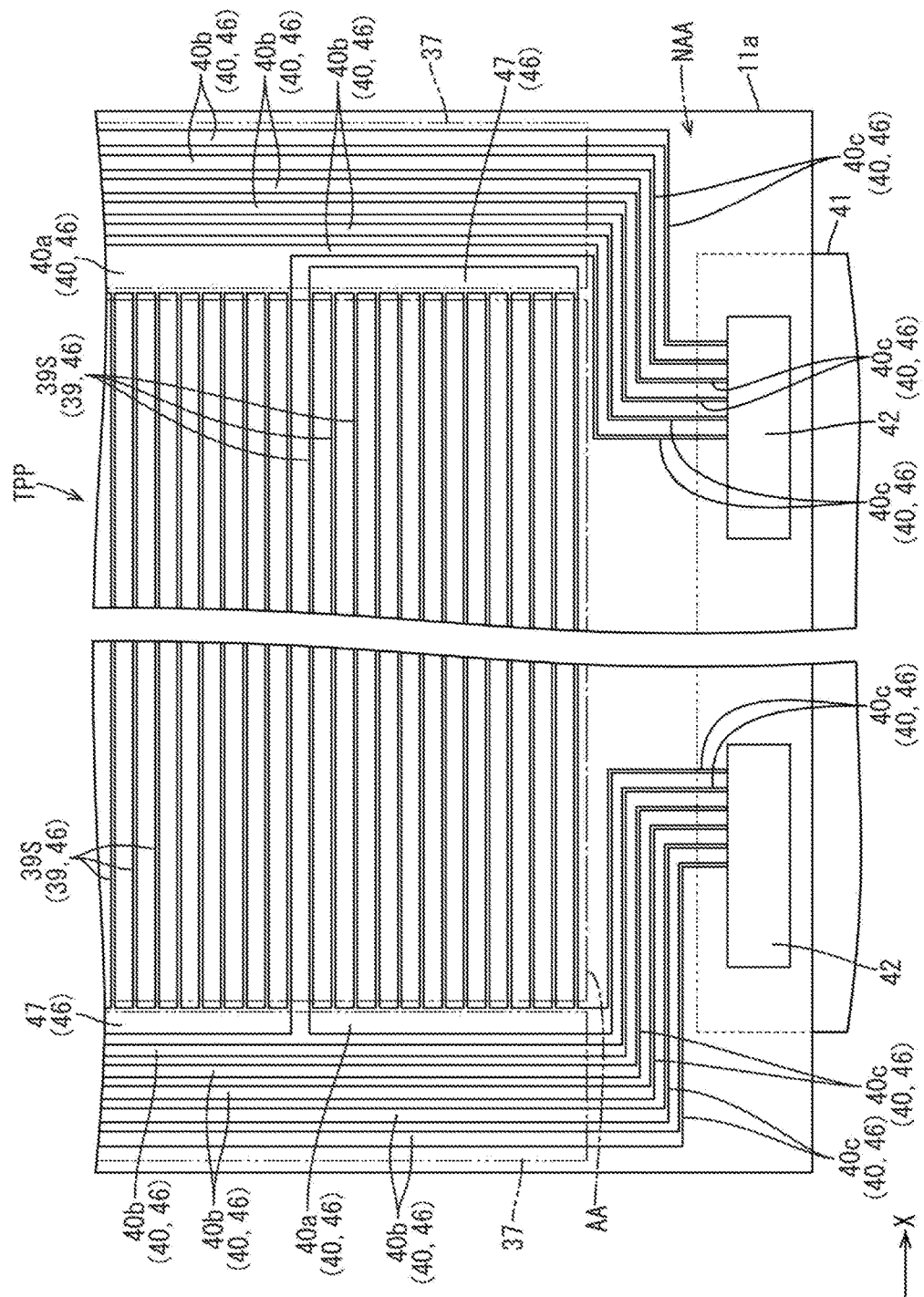
FIG. 11 is a magnified bottom view of the portions of the CF board at the ends with respect to the short-side direction at an end with respect to the long-side direction on the terminal portion side.

As illustrated in FIGS. 10 and 11, the widths of the second lines 40b of the position detection line portions 40 are different from one another according to the drive electrodes 39 to which the position detection line portions 40 are connected. Specifically, the widths of the first lines 40a and the third lines 40c of the position detection line portions 40 are substantially constant regardless of the drive electrodes 39 to which the position detection line portions 40 are connected. The widths of the second lines 40b connected to the drive electrodes 39 closer to the CF board-side contacts 42 are smaller and the widths of the second lines 40b that are connected to the drive electrodes 39 that are farther from the CF board-side contacts 42 are larger. The lengths of the position detection line portions 40 that are connected to the drive electrodes 39 that are farther from the CF board-side contacts 42 are longer than the lengths of the position detection line portions 40 that are connected to the drive electrodes 39 that are closer to the CF board-side contacts 42. Therefore, the wire resistances tend to be higher. By setting the widths of the second lines 40b larger as described above, the line resistances can be reduced. According to the configuration, differences in wire resistance between the position detection line portions 40 that are connected to the drive electrodes 39 that are farther from the CF board-side contacts 42 and the position detection line portions 40 that are connected to the drive electrodes 39 that are closer to the CF board-side contacts 42 can be reduced. Therefore, the position detection performances are less likely to be reduced. The dimensions of the first lines 40a of the position detection line portions 40 in the Y-axis direction (widths) are substantially constant. The X-dimensions of the first lines 40a that are connected to the drive electrodes 39 that are closer to the CF board-side contacts 42 are smaller.

Next, various films formed in layers on the inner surface of the CF board 11a (on the liquid crystal layer 11c side, on the opposed surface side to the array board 11b) by a known photolithography method will be described. As illustrated in FIGS. 7 and 8, the CF board 11a includes a layer of the light blocking portion 25 and the color filters 24, the metal film 46, and the planarization film 26 formed in layers in this sequence from the lower side (from the glass substrate, on the front side). Although not illustrated, the alignment film is formed over the planarization film 26. In this embodiment, although not illustrated, photo spacers having a columnar shape on the planarization film 26 on the upper layer side. The photo spacers protrude toward the array board 11b to penetrate through the liquid crystal layer 11c. The photo spacers are for maintaining a cell gap in mainly in the display area AA at constant.

Figure 14:
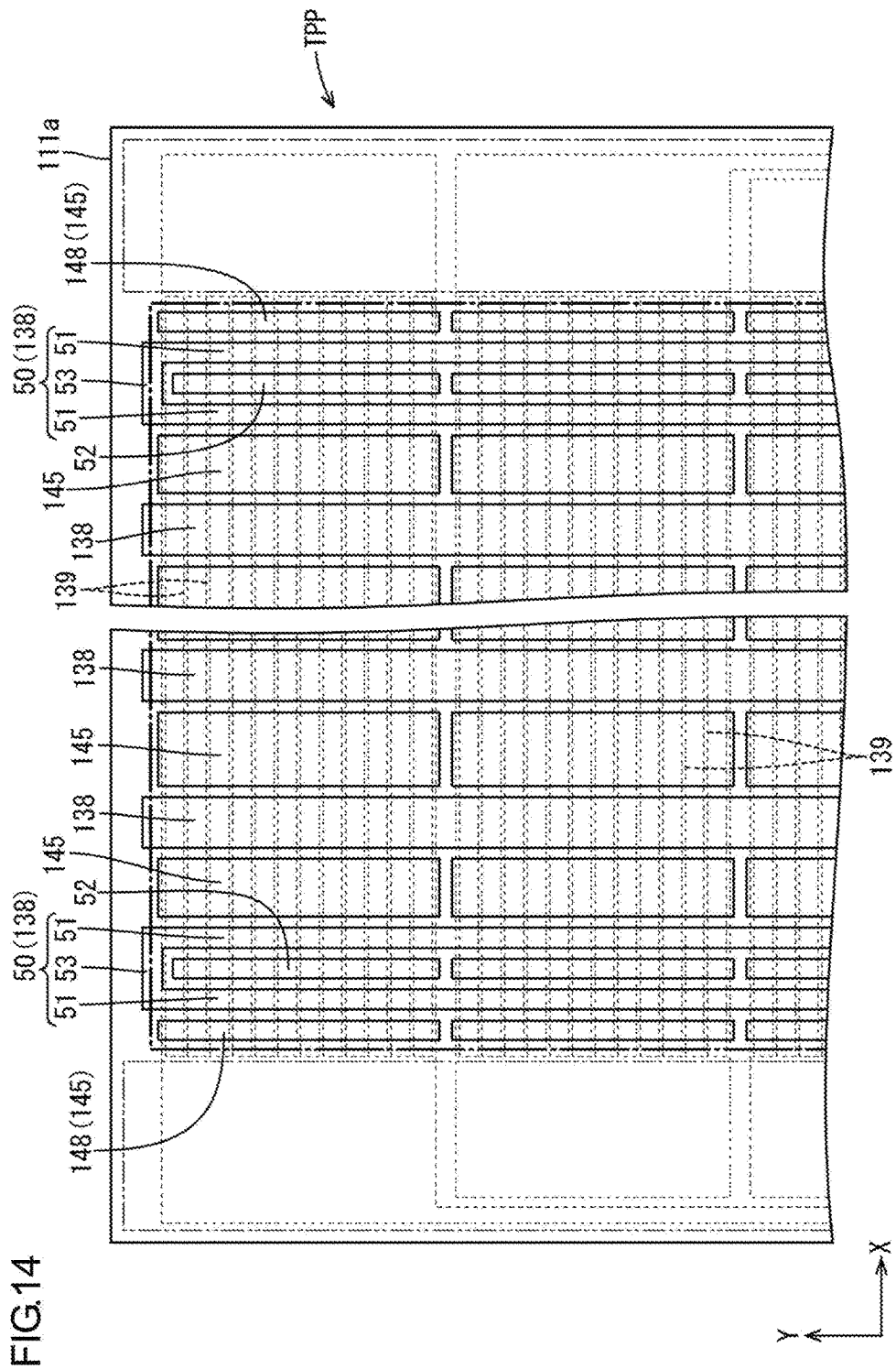
FIG. 14 is a magnified plan view of portions of a CF board at ends with respect to the short-side direction according to a second embodiment of the present invention.

As illustrated in FIGS. 7 and 8, the light blocking portion 25 is formed on the front surface of the glass substrate GS of the CF board 11a across the display area AA and the non-display area NAA. The light blocking portion 25 may be made of photosensitive resin with a light blocking material (e.g., carbon black) added thereto and thus have high light blocking properties. An area of the light blocking portion 25 in the display area AA is patterned in a grid in the plan view. An area of the light blocking portion 25 in the non-display area NAA is patterned in a frame form in the plan view. The pattern of the light blocking portion 25 in the display area AA is formed with traces that extend along the Y-axis direction and traces that extend along the X-axis direction connected to one another. As illustrated in FIG. 12, the traces define the pixel portions PX. Specifically, the traces of the light blocking portion 25 extending along the Y-axis direction are arranged at intervals to correspond to the short dimensions of the pixel portions PX in the X-axis direction (intervals with respect to the X-axis direction) in the display area AA. The traces of the light blocking portion 25 along the X-axis direction are arranged at intervals to correspond to the long dimensions of the pixel portions PX in the Y-axis direction (intervals with respect to the Y-axis direction) in the display area AA. As illustrated in FIGS. 7 and 8, the color filters 24 are arranged in the display area AA and formed in the island pattern that corresponds to the arrangement of the pixel electrodes 20 on the array board 11b, which will be described later. The color filters 24 may be made of photosensitive resin with pigments for coloring. Specifically, the color filters 24 include a large number of color portions that are two-dimensionally arranged in a matrix on the CF board 11a at positions to overlap the pixel electrodes 20 on the array board 11b in the plan view in the display area AA. Each of the color portions has a vertically-long rectangular in the plan view (not illustrated). The color filters 24 includes lines of the color portions that represent red, green, and blue, respectively, repeatedly arranged along the row direction (the X-axis direction). The lines of the color portions are arranged along the column direction (the Y-axis direction). In the display area AA, the adjacent color portions are separated from each other with the traces of the light blocking portion 25 for reducing color mixture between the pixel portions PX. The metal film 46 is formed above the light blocking portion 25. The metal film 46 is formed in a stripe pattern that overlaps the traces of the light blocking portion 25 along the X-axis direction in the display area AA to form the drive electrodes 39 (FIG. 14). Portions of the metal film 46 arranged in the non-display area NAA form the position detection line portions 40, the CF board-side contacts 42, and the dummy lines 47. The planarization film 26 is formed over the light blocking portion 25, the color filters 24, and the metal film 46 and in a solid pattern across the display area AA and the non-display area NAA. The planarization film 26 may be made of acrylic resin such as polymethylmethacrylate resin (PMMA). The planarization film 26 has a thickness larger than the thicknesses of the color filters 24, the light blocking portion 25, and the metal film 46. The surface of the CF board 11a on the liquid crystal layer 11c side (on which the alignment film is formed) is properly planarized. The planarization film 26 covers the drive electrodes 39, the position detection line portions 40, and the dummy lines 47 that are formed from the metal film 46 from the array board 11b side.

As illustrated in FIG. 9, the outermost floating electrodes 45 among the floating electrodes 45 that are arranged along the X-axis direction have a width (a dimension in the X-axis direction) smaller than a width of the floating electrode 45 closer to the middle. The floating electrodes 45 having the smaller width may be referred to as narrow floating electrodes 48 hereinafter. The width of the narrow floating electrodes 48 is about a half of the width of the floating electrodes 45 closer to the middle. The reason why the floating electrodes 45 include the narrow floating electrodes 48 will be described. Two detection electrodes 38 are adjacent to each floating electrode 45 closer to the middle with respect to the X-axis direction. Each floating electrode 45 and the two detection electrodes 38 form capacitors. On the other hand, one detection electrode 38 is adjacent to each narrow floating electrode 48 at the outermost. The narrow floating electrode 48 and the one detection electrode 38 form a capacitor. Therefore, by forming the narrow floating electrodes 48 having the width smaller than the width of the floating electrodes 45 closer to the middle at the outermost with respect to the X-axis direction, position detection areas to which the detection electrodes 38 are assigned for are equalized with respect to the X-axis direction.

However, in the configuration in which the floating electrodes 45 include the narrow floating electrodes 48, the capacitance between each detection electrode 38 at the outermost with respect to the X-axis direction and the narrow floating electrode 48 adjacent to and outer than the outermost detection electrode 38 and the capacitance between the outermost detection electrode 38 and the floating electrode 45 adjacent to and inner than the outermost detection electrode 38 tend to be smaller than the capacitance between each detection electrode 38 closer to the middle and the floating electrode 45 on either side. Namely, a difference between a capacitance value of the detection electrode 38 at the outermost with respect to the X-axis direction and a capacitance value of the detection electrode 38 adjacent to and inner than the outermost detection electrode 38 is larger than a difference between capacitance values of two detection electrodes 38 adjacent to each other in the inner area with respect to the X-axis direction. If a detection method using a difference between capacitance values of the detection electrodes 38 adjacent to each other with respect to the X-axis direction is used for the touch position detection to improve noise immunity, a large noise may be produced resulting from an increase in difference between the capacitance values. This may cause a local reduction in sensitivity in the position detection in an area closer to the edge with respect to the X-axis direction. An example of the detection method using a difference between capacitance values of the detection electrodes 38 adjacent to each other with respect to the X-axis direction is disclosed in an unexamined Japanese patent application publication No. 2013-3603. The entire contents of the publication are incorporated herein by reference.

As illustrated in FIG. 9, the detection electrodes 38 at the outermost with respect to the X-axis direction among the detection electrodes 38 are configured as wide detection electrodes 49 (wide first position detection electrodes) having a width (a dimension in the X-axis direction) larger than the width of the detection electrodes 38 closer to the middle. According to the configuration, capacitance between each wide detection electrode 49 at the outermost with respect to the X-axis direction among the detection electrodes 38 and the narrow floating electrode 48 adjacent to and outer than the wide detection electrode 49 and capacitance between the wide detection electrode 49 and the floating electrode 45 adjacent to and inner than the side detection electrode 49 are larger in comparison to the capacitances in the configuration in which the width of the detection electrodes 38 at the outermost with respect to the X-axis direction and the width of the detection electrodes 38 closer to the middle are equal to each other. Capacitance values of the wide detection electrodes 49 at the outermost with respect to the X-axis direction are closer to the capacitance values of the detection electrodes 38 closer to the middle. Namely, the difference in capacitance value can be reduced. According to the configuration, even if the detection method using the difference between capacitance values of the detection electrodes 38 adjacent to each other with respect to the X-axis direction is used for the touch position detection to improve the noise immunity, the wide detection electrodes 49 are less likely to be subject to the noise. The local reduction in sensitivity in the position detection is less likely to occur in the area closer to the edge with respect to the X-axis direction. If the width of the detection electrodes 38 closer to the middle other than the wide detection electrodes 49 among the detection electrodes 38 is about 15 μm, it is preferable to set the width of the wide detection electrode 49 to about 30 μm, that is, about twice larger the width of the detection electrodes 38 closer to the middle.

Figure 13:
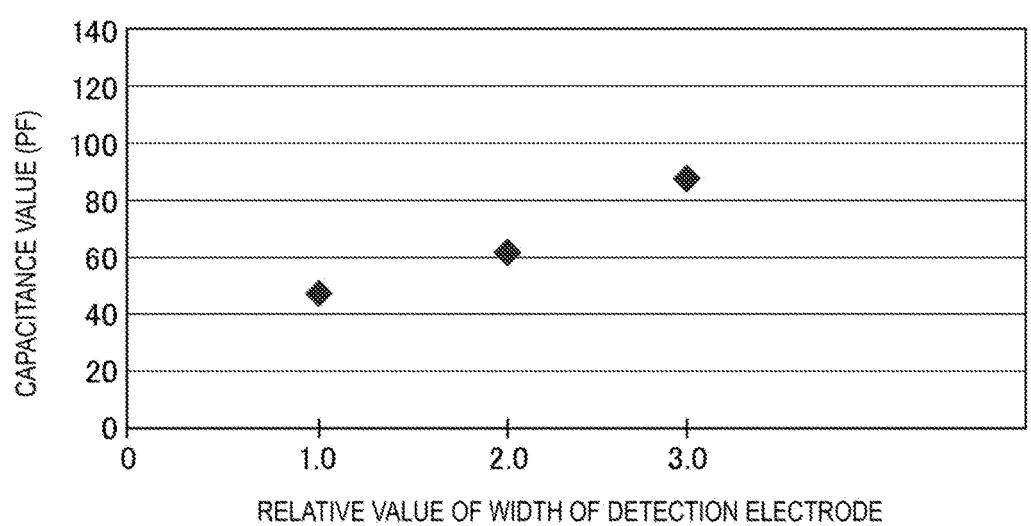
FIG. 13 is a graph illustrating the relationship between relative value of width of a detection electrode and capacitance value of the detection electrode obtained from comparative experiment 1.

Comparative experiment 1 was conducted to observe how the capacitance values change according to a change in width of the detection electrodes 38. In comparative experiment 1, the widths of the detection electrodes 38 were set to a predefined reference width (a relative value of 1.0), a width that is twice of the reference width (a relative value of 2.0), and a width that is three times larger than the reference width (a relative value of 3.0), and the capacitance values of the detection electrodes 38 were measured. Results of comparative experiment 1 are present in FIG. 13. In FIG. 13, the horizontal axis represents the relative values to the reference value of 1.0 regarding the widths of the detection electrodes 38 and the vertical axis represents the capacitance values (in unit of picofarad (pF)).

The results of comparative experiment 1 will be described. From FIG. 13, it is clear that the capacitance value of the detection electrode 38 increases as the width of the detection electrode 38 increases. This describes that the capacitance value of the detection electrode 38 tends to be proportional to an area of the detection electrode 38. This may be because the capacitance between the detection electrode 38 and the adjacent floating electrode 45 increases as the area of the detection electrode 38 increases. From the results of comparative experiment 1, it is clear that the capacitance values of the wide detection electrodes 49 that are the detection electrodes 38 at the outermost with respect to the X-axis direction and having the width larger than the width of the detection electrodes 38 closer to the middle can be adjusted closer to, or more preferably equal to, the capacitance values of the detection electrodes 38 closer to the middle by properly adjusting the width. Although the capacitance values of the wide detection electrodes 49 may locally decrease, according to the configuration, the differences between the capacitance values of the wide detection electrodes 49 and the capacitance values of the detection electrodes 38 closer to the middle can be reduced. Therefore, the local reduction in sensitivity in the position detection in the areas closer to the edges with respect to the X-axis direction is less likely to occur and unevenness in sensitivity in the position detection is less likely to occur.

As described above, the touchscreen pattern TPP (the position inputting device) according to this embodiment includes the detection electrodes 38 (the first position detection electrodes), the drive electrodes 39 (the second position detection electrodes), the floating electrodes 45, and the wide detection electrodes 49 (the wide first position detection electrodes). The detection electrodes 38 extend along the first direction (the Y-axis direction). The detection electrodes 38 are arranged along the second direction (the X-axis direction) perpendicular to the first direction. The drive electrodes 39 extend along the second direction to overlap the detection electrodes 38 in the plan view. The drive electrodes 39 that are arranged along the first direction and the detection electrodes 38 form capacitors. The floating electrodes 45 arranged adjacent to the detection electrodes 38, respectively, in the plan view to overlap the drive electrodes 39. The floating electrodes 45 and the adjacent detection electrodes 38 form capacitors. The floating electrodes 45 and the overlapping drive electrodes 39 form capacitors. The wide detection electrodes 49 are included in the detection electrodes 38 and located at the outermost with respect to the second direction. The width of the wide detection electrodes 49 is larger than the width of the detection electrodes 38 closer to the middle.

According to the configuration, the detection electrodes 38 and the drive electrodes 39 that overlap the detection electrodes 38 form the capacitors. Furthermore, the floating electrodes 45 and the adjacent detection electrodes 38 form the capacitors, and the floating electrodes 45 and the overlapping drive electrodes 39 form the capacitors. Therefore, higher sensitivity (an S/N ratio) can be achieved in the position detection. The capacitance between each detection electrode 38 at the outermost with respect to the second direction among the detection electrodes 38 that are arranged along the second direction tends to be smaller than the capacitance between each detection electrode 38 closer to the middle and the adjacent floating electrode 45. Therefore, the difference in capacitance value tends to be larger and thus a large noise may be produced in the position detection resulting in a local reduction in sensitivity in the position detection. The detection electrodes 38 at the outermost with respect to the second direction among the detection electrodes 38 are configured as the wide detection electrodes 49 having the width larger than the width of the detection electrodes 38 closer to the middle. Therefore, the capacitance between each wide detection electrode 49 and the adjacent floating electrode 45 is larger and thus the difference in capacitance value relative to the detection electrodes 38 closer to the middle can be reduced. According to the configuration, the wide detection electrodes 49 are less likely to be subject to the noise in the position detection and thus the local reduction in sensitivity in the position detection is less likely to occur in the edge areas.

The floating electrodes 45 include the narrow floating electrodes 48 that are located at the outermost with respect to the second direction and have the width smaller than the width of the floating electrodes 45 closer to the middle. Two detection electrodes 38 are adjacent to the each floating electrode 45 closer to the middle among the floating electrodes 45. Each floating electrode 45 closer to the middle and the two detection electrodes 38 form the capacitors. On the other hand, one detection electrode 38 is adjacent to each floating electrode 45 at the outermost with respect to the second direction among the floating electrodes 45. Each floating electrode 45 at the outermost and the one detection electrode 38 form the capacitor. Therefore, by forming the narrow floating electrodes 48 having the width smaller than the width of the floating electrodes 45 closer to the middle at the outermost with respect to the second direction, position detection areas to which the detection electrodes 38 are assigned for are equalized with respect to the second direction. In the configuration in which the floating electrodes 45 include the narrow floating electrodes 48, the capacitances of the detection electrodes 38 at the outermost with respect to the second direction tend to be smaller. According to the configuration, the capacitances of the detection electrodes 38 at the outermost with respect to the second direction can be increased and thus the detection electrodes 38 at the outermost with respect to the second direction are less likely to be subject to the noise in the position detection. Therefore, the local reduction in sensitivity in the position detection is less likely to occur in the edge areas.

The liquid crystal display device 10 (the display device with the position inputting function) according to this embodiment includes at least the touchscreen pattern TPP and the liquid crystal panel 11 (the display panel) including the touchscreen pattern TPP.

Because the display device with the position inputting function includes the liquid crystal panel 11 and the touchscreen pattern TPP, position input by the user and display of information on the liquid crystal panel 11 can be smoothly linked together. This configuration is preferable for improving the usability.

The liquid crystal panel 11 includes the array board 11b and the CF board 11a (the common board). The array board 11b includes at least the TFTs 19 (the display components) in the display area AA in which images are displayed. The CF board 11a is opposed to the array board 11b with the gap. The touchscreen pattern TPP includes the drive electrodes 39, the detection electrodes 38, the floating electrodes 45 or floating electrodes 345. The drive electrodes 39 are formed on the plate surface of the CF board 11a facing the array board 11b in the display area AA. The detection electrodes 38 and the floating electrodes 45 or the floating electrodes 345 are formed on the plate surface of the CF board 11a facing an opposite side from the array board 11b in the display area AA. The touchscreen pattern TPP is integrally formed with the liquid crystal panel 11. Because the touchscreen pattern is integrally formed with the liquid crystal panel 11, in comparison to the configuration in which the touchscreen pattern is formed on a touchscreen component separate from the liquid crystal panel, this configuration is preferable for reducing the thickness or the cos to the liquid crystal display device 10.

Second Embodiment

A second embodiment of the present invention will be described with reference to FIG. 14. The second embodiment includes detection electrodes 138. The detection electrodes 138 that are located at the outermost with respect to the X-axis direction have a configuration different from the first embodiment. Configurations, functions, and effects similar to those of the first embodiment will not be described.

As illustrated in FIG. 14, the detection electrodes 138 at the outermost with respect to the X-axis direction (the second direction) among the detection electrodes 138 are configured as branched-type detection electrodes 50 (branched-type first position detection electrodes) including branch electrodes 51. Each branched-type detection electrode 50 includes multiple branch electrodes 51 that are connected together. Furthermore, inter-branch-electrode floating electrodes 52 are formed between the branch electrodes 51 so as to be sandwiched between the branch electrodes 51. The branch electrodes 51 and the inter-branch-electrode floating electrodes 52 form capacitors. The branch electrodes 51 extend along the Y-axis direction (the first direction). Multiple pairs of the branch electrodes 51 are arranged at intervals with respect to the X-axis direction. Each branch electrode 51 has a width smaller than a width of the detection electrodes 138 closer to the middle. Specifically, the width of the branch electrode 51 is about a half of the width of the detection electrodes 138. Namely, a sum of areas of two branch electrodes 51 of each branched-type detection electrode 50 is about equal to an area of the detection electrode 138 closer to the middle. Two branch electrodes 51 are connected to each other with a bridging portion 53 (a connecting portion, a joining portion). Ends of the branch electrodes 51 in the extending direction are bridged with the bridging portion 53. Each inter-branch-electrode floating electrode 52 is sandwiched between two branch electrodes 51 adjacent to each other with respect to the X-axis direction. The inter-branch-electrode floating electrode 52 has a width slightly smaller than an interval between the branch electrodes 51. The width of the inter-branch-electrode floating electrode 52 is smaller than the width of the floating electrodes closer to the middle among floating electrodes 145 and about equal to the width of narrow floating electrodes 148 at the outermost. The inter-branch-electrode floating electrode 52 and adjacent two branch electrodes 51 form capacitors. The inter-branch-electrode floating electrodes 52 are divided into segments with respect to the Y-axis direction similarly to the floating electrodes 145 (including the narrow floating electrodes 148).

Although the width of two branch electrodes 51 in each branched-type detection electrode 50 is smaller than the width of the detection electrodes 138 closer to the middle, the branch electrodes 51 and the inter-bridge-electrode floating electrodes 52 form the capacitors and density of electric lines of force between the branch electrodes 51 and the inter-branch-electrode floating electrode 52 is higher than density of electric lines of force between the detection electrode 138 closer to the middle and the floating electrode 145 closer to the middle. Therefore, the capacitance of the branched-type detection electrode 50 is larger and thus the difference in capacitance value which may be produced relative to the detection electrode 138 closer to the middle can be reduced. According to the configuration, the branched-type detection electrodes 50 are less likely to be subject to the noise in the position detection and thus the local reduction in sensitivity in the position detection is less likely to occur in the edge areas. Furthermore, the sum of the widths of two branch electrodes 51 in each branched-type detection electrode 50 is about equal to the width of the detection electrode 138 closer to the middle. Therefore, occupied areas of the branched-type detection electrodes 50 and the detection electrodes 138 closer to the middle within a plane of the CF board 111a (the touchscreen pattern TPP) are about equal to each other. Namely, the local reduction in sensitivity in the position detection can be restricted with the branched-type detection electrodes 50 each including two branch electrodes 51 connected to each other while the occupied area of the detection electrodes 138 is maintained about the same as the previous embodiment.

As described above, this embodiment includes the detection electrodes 138, drive electrodes 139, the floating electrodes 145, the branched-type detection electrodes 50, and the inter-branch-electrode floating electrodes 52. The detection electrodes 138 extend along the first direction (the Y-axis direction). The detection electrodes 138 are arranged along the second direction (the X-axis direction) perpendicular to the first direction. The drive electrodes 139 extend along the second direction to overlap the detection electrodes 138 in the plan view. The drive electrodes 139 are arranged along the first direction. The detection electrodes 138 and the drive electrodes 139 form the capacitors. The floating electrodes 145 are arranged adjacent to the detection electrodes 138 in the plan view and to overlap the drive electrodes 139 in the plan view. The floating electrodes 145 and the adjacent detection electrodes 138 form the capacitors. The floating electrodes 145 and the overlapping drive electrodes 139 form the capacitors. The branched-type detection electrodes 50 (the branched-type first position detection electrodes) are included in the detection electrodes 138. The branched-type detection electrodes 50 are located at the outermost with respect to the second direction. Each branched-type detection electrode 50 includes the branch electrodes 51 that extend along the first direction and are arranged along the second direction. The branch electrodes 51 are connected to each other. The inter-branch-electrode floating electrodes 52 are sandwiched between the branch electrodes 51. The blanch electrodes 51 and the inter-branch-electrode floating electrodes 52 form the capacitors.

According to the configuration, not only the detection electrodes 138 and the overlapping drive electrodes 139 form the capacitors but also the floating electrodes 145 and the adjacent detection electrodes 138 form the capacitance. Furthermore, the floating electrodes 145 and the overlapping drive electrodes 139 form the capacitors. Therefore, further higher sensitivity (the S/N ratio) can be achieved in the position detection. The capacitances between the detection electrodes at the outermost with respect to the second direction among the detection electrodes 138 that are arranged along the second direction and the adjacent floating electrodes 145 are smaller in comparison to the detection electrodes 138 closer to the middle. Therefore, the differences in capacitance value tend to be larger and a large noise may be produced resulting in the local reduction in sensitivity in the position detection. The branched-type detection electrodes 50 that are some of the detection electrodes 138 located at the outermost with respect to the second direction. The branched-type detection electrodes 50 include the branch electrodes 51 that extend along the first direction. The branch electrodes 51 are arranged along the second direction and connected to each other. The branch electrodes 51 and the inter-branch-electrode floating electrodes 52 sandwiched between the branch electrodes 51 form the capacitors. Therefore, the capacitances of the branched-type detection electrodes 50 are large and thus the differences in capacitance value which may be produced relative to the detection electrodes 138 closer to the middle can be reduced. According to the configuration, the branched-type detection electrodes 50 are less likely to be subject to the noise in the position detection and thus the local reduction in sensitivity in the position detection is less likely to occur in the edge areas.

The sum of the branch electrodes 51 of each branched-type detection electrode 50 is equal to the width of the detection electrode 138 closer to the middle. According to the configuration, the occupied areas of the branched-type detection electrodes 50 and the detection electrodes 138 closer to the middle in the touchscreen pattern TPP are about equal to each other. Namely, the local reduction in sensitivity in the position detection can be restricted with the branched-type detection electrodes 50 each including two branch electrodes 51 connected to each other while the occupied area of the detection electrodes 138 is maintained about the same as the previous embodiment.

Third Embodiment

Figure 16:
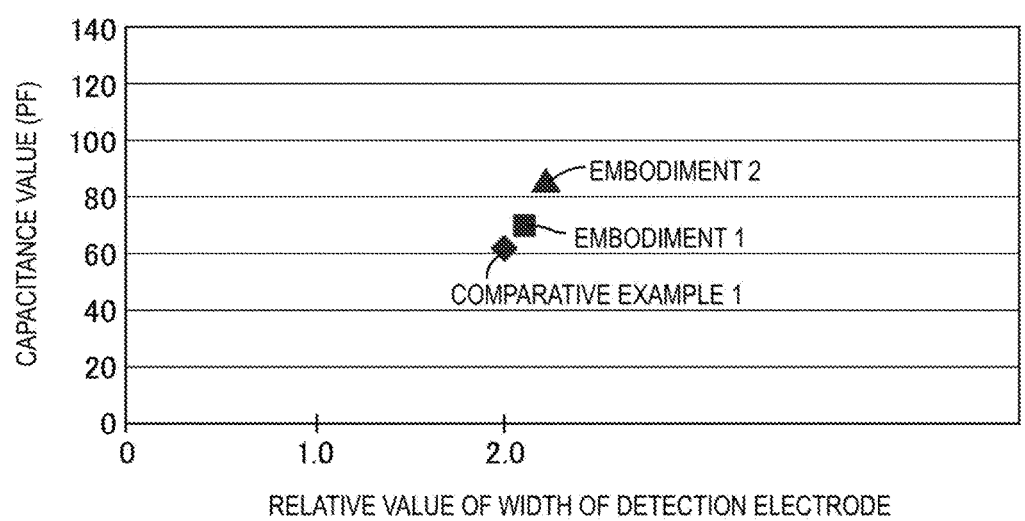
FIG. 16 is a graph illustrating the relationship between relative value of width of a detection electrode and capacitance value of the detection electrode of comparative example 1, the relationship between relative value of width of a detection electrode and capacitance value of the detection electrode of embodiment 1, and the relationship between relative value of width of a detection electrode and capacitance value of the detection electrode of embodiment 2 obtained from comparative experiment 2.
Figure 17:
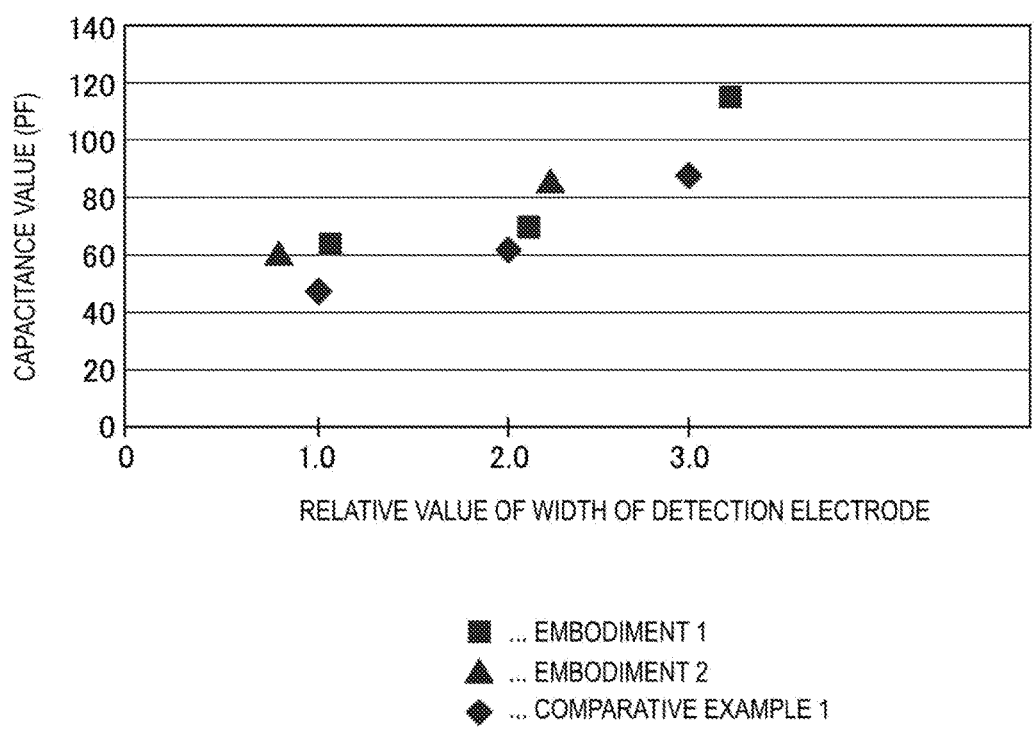
FIG. 17 is a graph illustrating the relationship between relative value of width of a detection electrode and capacitance value of the detection electrode of comparative example 1, the relationship between relative value of width of a detection electrode and capacitance value of the detection electrode of embodiment 1, and the relationship between relative value of width of a detection electrode and capacitance value of the detection electrode of embodiment 2 obtained from comparative experiment 3.

A third embodiment will be described with reference to FIGS. 15 to 17. The third embodiment includes branched-type detection electrodes 250 and inter-branch-electrode floating electrodes 252. The number of branches of each branched-type detection electrode 250 and the number of the inter-branch-electrode floating electrodes 252 are different from those of the second embodiment. Configurations, functions, and effects similar to those of the second embodiment will not be described.

Figure 15:
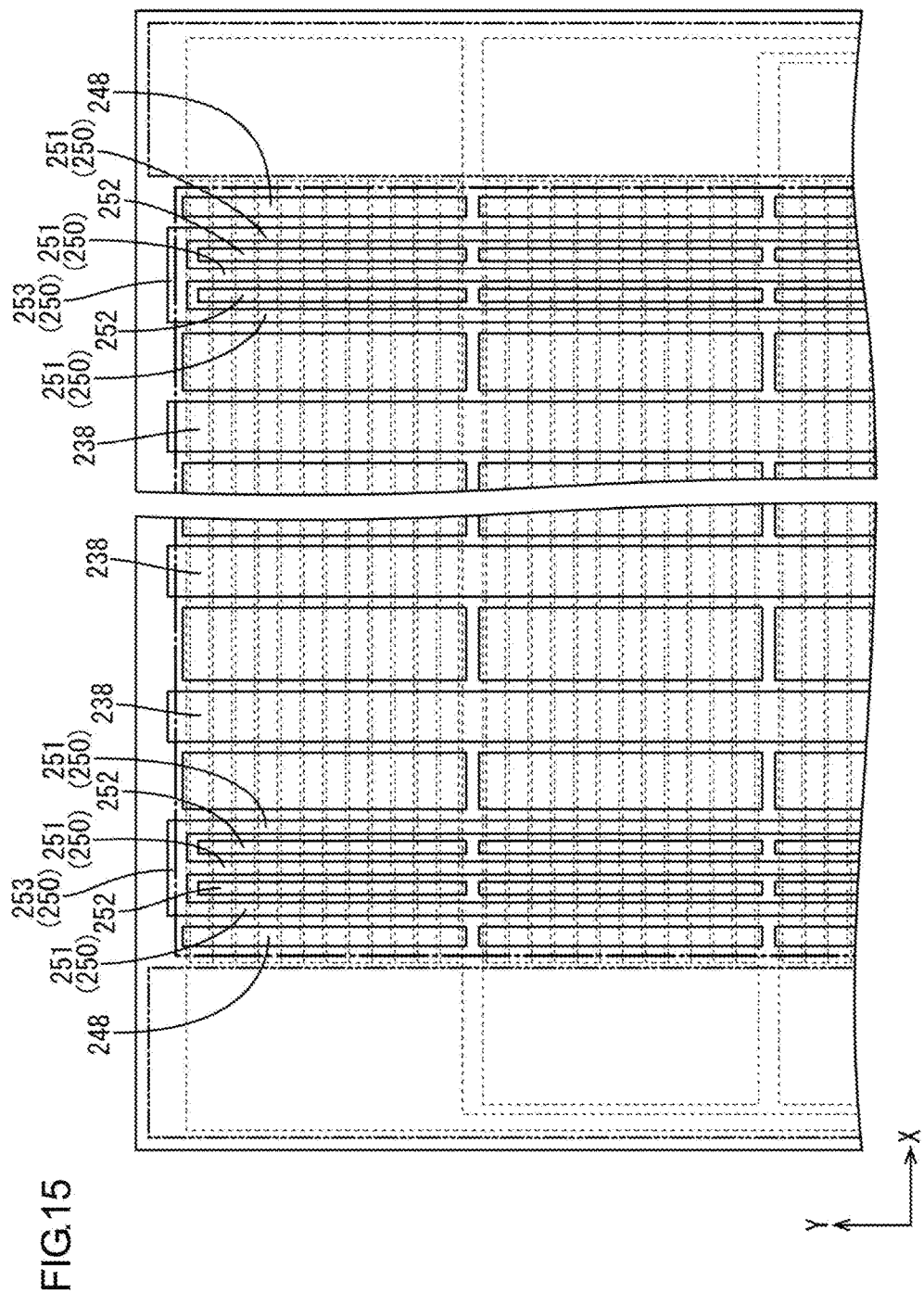
FIG. 15 is a magnified plan view of portions of a CF board at ends with respect to the short-side direction according to a third embodiment of the present invention.

As illustrated in FIG. 15, each branched-type detection electrode 250 according to this embodiment includes three branch electrodes 251 that are arranged at intervals along the X-axis direction and connected to one another. Each branch electrode 251 has a width smaller than a width of a detection electrode 238 closer to the middle, specifically, one third of the width of the detection electrode 238 closer to the middle. Namely, a sum of widths of two branch electrodes 251 of the branched-type detection electrode 250 is about equal to the width of the detection electrode 238 closer to the middle. Ends of the three branch electrodes 251 with respect to an extending direction of the branch electrodes 251 are connected to one another with a bridging portion 253. Two lines of inter-branch-electrode floating electrodes 252 are arranged between the middle branch electrode 251 with respect to the X-axis direction and the side branch electrode 251 and between the middle branch electrode 251 and the other side branch electrode 251, respectively. A width of each inter-branch-electrode floating electrode 252 is slightly smaller than a distance between adjacent two branch electrodes 251. The width of the inter-branch-electrode floating electrode 252 is smaller than a width of a narrow floating electrode 248 at the outermost. The inter-branch-electrode floating electrode 252 and adjacent two branch electrodes 251 that sandwich the inter-branch-electrode floating electrode 252 form capacitors.

Comparative experiment 2 was conducted to observe capacitance values in a configuration including detection electrode having a branch structure and a configuration including a detection electrode not having the branch structure. In comparative experiment 2, the configuration including the detection electrode 238 not having the branch structure was referred to as comparative example 1, the configuration including a detection electrode having the branch structure including two branches was referred to as embodiment 1, and the configuration including a detection electrode having the branch structure including three branches was referred to as embodiment 2. Capacitance values in the configurations were measured. The results of the comparative experiment 2 are present in FIG. 16. The configuration of comparative example 1 is similar to the configuration of the detection electrode 238 closer to the middle described earlier. The configuration of embodiment 1 is similar to the configuration of the branched-type detection electrode in the second embodiment (see FIG. 14). The configuration of embodiment 2 is similar to the configuration of the branched-type detection electrode 250 described earlier. In embodiments 1 and 2, the inter-branch-electrode floating electrodes are sandwiched between the branch electrodes of the branched-type detection electrodes. In FIG. 16, the horizontal axis represents relative values of widths of the detection electrodes 238 with a reference value being 1.0 and the vertical axis represents capacitance values (in unit of picofarad (pF). In comparative experiment 2, the relative values of the widths of the detection electrodes of comparative example 1, embodiment 1 and embodiment 2 are 2.0. In FIG. 16, the results regarding comparative experiment 1, embodiment 1, and embodiment 2 are expressed with a diamond mark, a square mark, and a triangle mark, respectively.

The results of comparative experiment 2 will be described. From FIG. 16, in comparison between comparative example 1 and embodiment 1, it is clear that the capacitive value of the detection electrode in embodiment 1 having the branch structure is larger than the capacitive value of the detection electrode in embodiment 1 not having the branch structure. As described earlier in the second embodiment section, two branch electrodes in each branched-type detection electrode in embodiment 1 and the inter branch-electrode floating electrode form the capacitors. Therefore, density of electric lines of force between the branch electrodes and the inter-branch-electrode floating electrode is higher than density of electric lines of force between the detection electrodes and the adjacent floating electrode in comparative example 1. Therefore, the capacitance of the branched-type detection electrode may be larger. In comparison between embodiment 1 and embodiment 2, the capacitance value of the detection electrode in embodiment 2 including three branches is larger than the capacitance value of the detection electrode in embodiment 1 including two branches. Three branch electrodes in the branched-type detection electrode in embodiment 2 and the inter-branch electrode floating electrodes that are arranged among the branch electrodes form the capacitors. Therefore, the density of electric lines of force between the branch electrodes and the inter-branch-electrode floating electrode in embodiment 2 is further higher than the density of electric lines of force between the detection electrodes and the adjacent floating electrode in embodiment 1. According to the configuration, it is considered that the capacitance of the branched-type detection electrode in embodiment 2 is further larger.

Comparative experiment 3 was conducted to observe how capacitance values change according to variations in width of the detection electrodes in comparative example 1, embodiment 1, and embodiment 2. In comparative experiment 3, the widths of the detection electrodes in were set to predefined reference widths (a relative value of 1.0), widths that were twice of the reference widths (a relative value of 2.0), and widths that were three times larger than the reference widths (a relative value of 3.0), and the capacitance values of the detection electrodes were measured. Results of comparative experiment 3 are present in FIG. 17. In FIG. 17, the horizontal axis represents relative values of widths of the detection electrodes with a reference value being 1.0 and the vertical axis represents capacitance values (in unit of picofarad (pF). Data regarding the width of the detection electrode three times larger than the reference width in embodiment 2 is not present.

The results of comparative experiment 3 will be described. From FIG. 17, it is clear that the capacitance values of the detection electrodes increase as the widths of the detection electrodes increase. Furthermore, the capacitance values of the detection electrodes increase as the numbers of the branches of the detection electrodes having the branch structures increase. By properly setting the numbers of the branches and the widths of the detection electrodes at the outermost with respect to the X-axis direction among the detection electrodes having the branch structures, the capacitance values of the detection electrodes at the outermost can be set closer to, more preferably about equal to, the capacitance values of the detection electrodes closer to the middle. According to the configuration, difference in capacitance values which may be produced between the branched-type detection electrodes at the outermost with respect to the X-axis direction and the detection electrodes 238 closer to the middle can be reduced and thus local reduction in sensitivity in the position detection is less likely to occur in edge areas. Therefore, the sensitivities in position detection can be equalized.

Fourth Embodiment

A fourth embodiment will be described with reference to FIGS. 18 to 21. The fourth embodiment includes detection electrodes 338, a configuration of which at the outermost with respect to the X-axis direction is different from that of the first embodiment. Furthermore, this embodiment includes a CF board 311a including second floating electrodes 54 in the non-display area NAA. Configurations, functions, and effects similar to those of the first embodiment will not be described.

Figure 18:
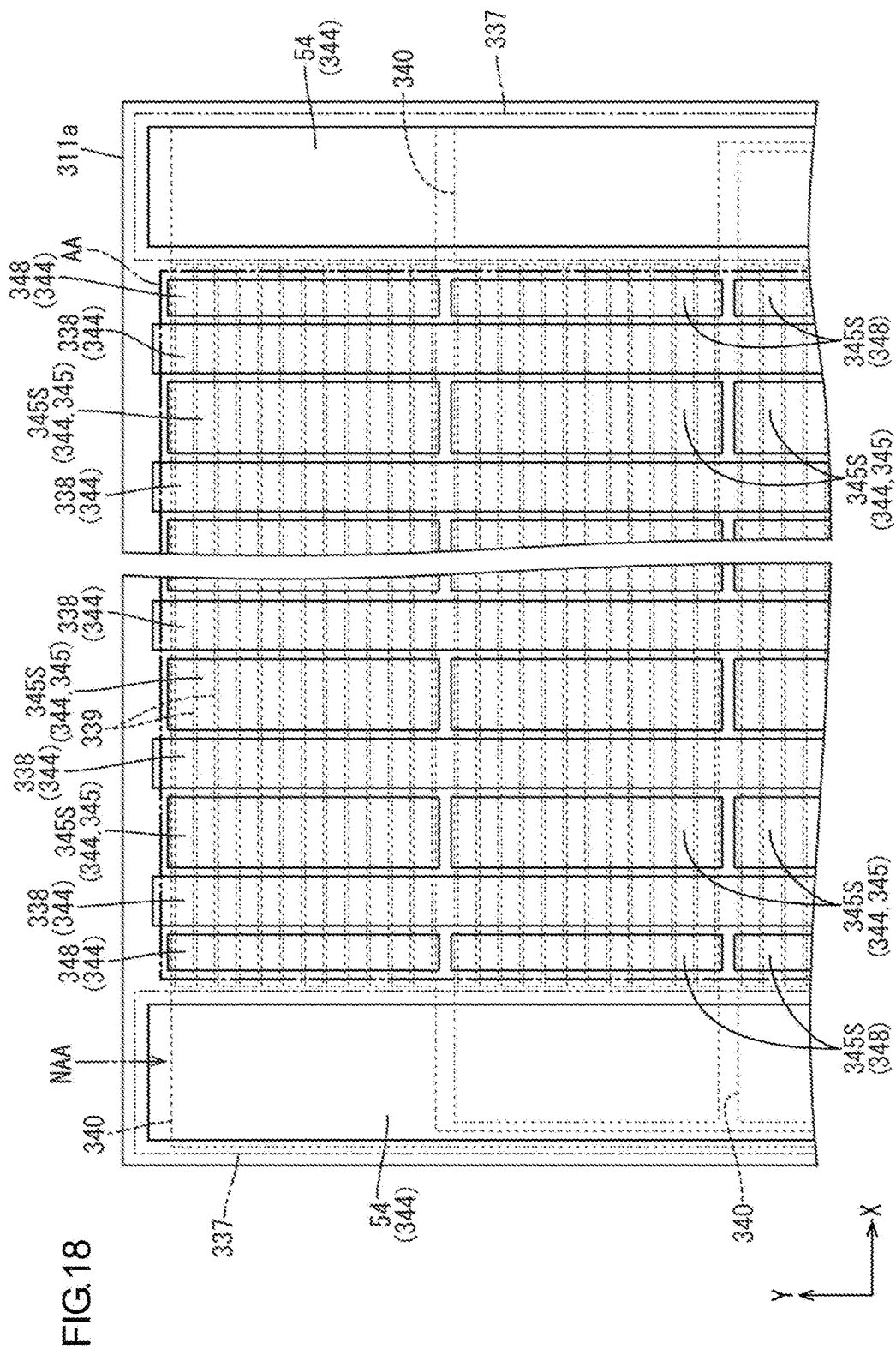
FIG. 18 is a magnified plan view of portions of a CF board at ends with respect to the short-side direction according to a fourth embodiment of the present invention.

Among the detection electrodes 338 according to this embodiment, those at the outermost with respect to the X-axis direction (the second direction) have a width equal to a width of those closer to the middle as illustrated in FIG. 18. Namely, widths of detection electrodes 228 that are arranged along the X-axis direction are all equal. The CF board 311a includes the second floating electrodes 54 in the non-display area NAA. The second floating electrodes 54 and the detection electrodes 338 at the outermost with respect to the X-axis direction form capacitors. The second floating electrodes 54 are formed in long-edge portions of the CF board 311a in the non-display area NAA, namely, one second floating electrode 54 is formed on either side of the display area AA in which the detection electrodes 338, the floating electrodes 345 (first floating electrodes), and drive electrodes 339 are formed with respect to the X-axis direction. The second floating electrodes 54 do not overlap the detection electrodes 338, the floating electrodes 345, and the drive electrodes 339 in the display area AA in the plan view. The second floating electrodes 54 overlap position detection lines 340 that are formed on the inner surface of the CF board 311a in the non-display area NAA in the plan view. Furthermore, the second floating electrodes 54 overlap monolithic circuits 337 of the array board in the non-display area NAA in the plan view.

As illustrated in FIG. 18, the second floating electrodes 54 are arranged adjacent to and outer than narrow floating electrodes 348 at the outermost with respect to the X-axis direction among the floating electrodes 345. The second floating electrodes 54 are physically and electrically isolated from the detection electrodes 338 and the floating electrodes 345 and formed in an island pattern. The second floating electrodes 54 and the detection electrodes 338 at the outermost with respect to the X-axis direction form capacitors.

Namely, the detection electrodes 338 at the outermost with respect to the X-axis direction form the capacitors not only with the overlapping drive electrodes 339, the floating electrodes 345 adjacent on sides closer to the middle, and the adjacent narrow floating electrodes 348 closer to the edges but also with the second floating electrodes 54. Therefore, further larger capacitance values can be achieved. This configuration is preferable for improving the sensitivity in the position detection (the S/N ratio). Each second floating electrode 54 has a vertically-long rectangular two-dimensional shape that extends in the Y-axis direction (the first direction). A length of the second floating electrode 54 is larger than a length of segment floating electrodes 345S (segment first floating electrodes) of the floating electrodes 345 and equal to or larger than the long edge of the display area AA. The length of second floating electrode 54 may be equal to the length of the detection electrodes 338.

Figure 19:
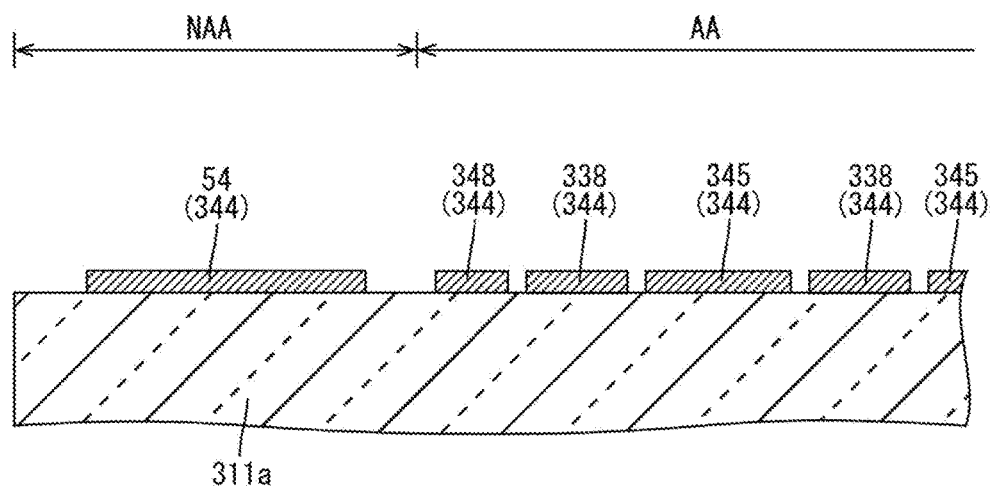
FIG. 19 is a cross-sectional view of a portion of the CF board at an end with respect to the short-side direction cut along the short-side direction.

As illustrated in FIG. 19, the second floating electrodes 54 are formed on the outer surface of the CF board 311a in the non-display area NAA. The second floating electrodes 54 are formed from a transparent electrode film 344 that forms the detection electrodes 338 and the floating electrodes 345 and in the same layer in which the detection electrodes 338 and the floating electrodes 345 are formed on the outer surface of the CF board 311a. The second floating electrodes 54, the floating electrodes 345, and the detection electrodes 338 are formed by forming the transparent electrode film 344 in a solid pattern on the outer surface of the CF board 311a and patterning the transparent electrode film 344. According to the method, the second floating electrodes 54, the floating electrodes 345, and the detection electrodes 338 that are electrically independent from one another are formed.

Figure 20:
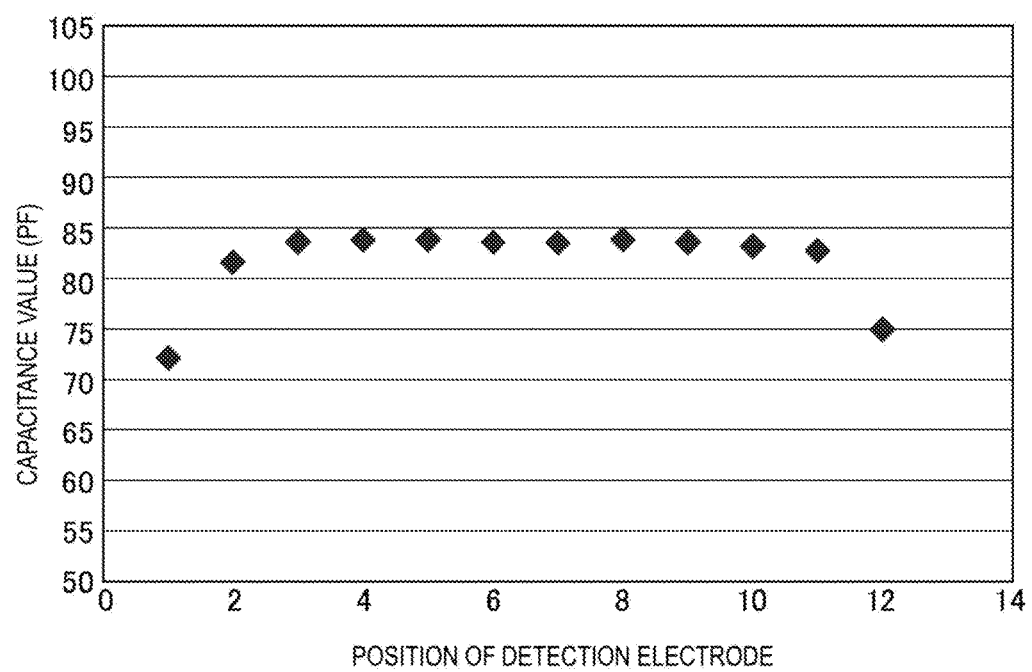
FIG. 20 is a graph illustrating the relationship between position of a detection electrode and capacitance value of the detection electrode of comparative example 2 in comparative experiment 4.
Figure 21:
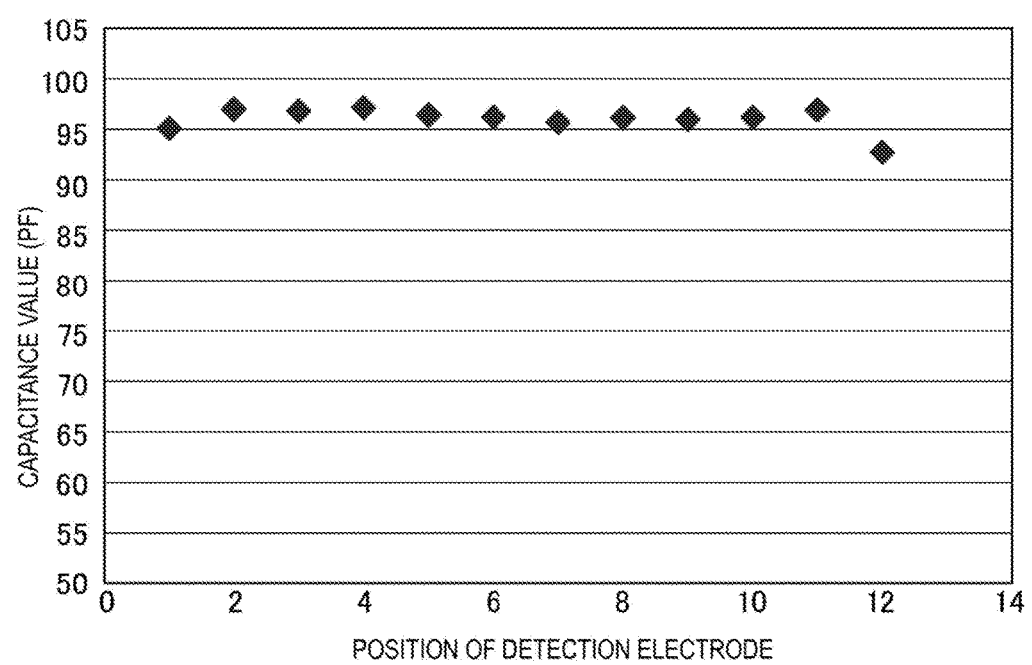
FIG. 21 is a graph illustrating the relationship between position of a detection electrode and capacitance value of the detection electrode of embodiment 3 in comparative experiment 4.

Next, comparative experiment 4 was conducted to observe how the capacitance value of the detection electrode 338 at the outermost with respect to the X-axis direction change according to whether the second floating electrode 54 is provided. In comparative experiment 4, comparative example 2 having a configuration that does not include the floating electrode 54 and embodiment 3 having a configuration that includes the second floating electrode 54 were used. Capacitance values of the detection electrodes 338 in comparative example 2 and embodiment 3 were measured. Results of the comparative experiment 4 are present in FIGS. 20 and 21. Comparative example 1 has the same configuration as the CF board 311a described in the previous paragraphs except for the second floating electrodes 54 that are removed. Embodiment 3 has the same configuration as the CF board 311a described in the previous paragraphs. FIG. 20 illustrates the results of comparative example 2 and FIG. 21 illustrates the results of embodiment 3. In FIGS. 20 and 21, the horizontal axes represent positions of the detection electrodes 338 and the vertical axes represent capacitive values (in unit of picofarad (pF). More specifically, the numbers on the horizontal axes in FIGS. 20 and 21 represents a sequence of the detection electrodes 338 from the leftmost with respect to the X-axis direction in FIG. 18. The detection electrode 338 at the leftmost in FIG. 18 is "1" and the detection electrode 228 at the rightmost in FIG. 18 is "12."

The results of comparative experiment 4 will be described. As illustrated in FIG. 20, the capacitance values of the detection electrodes 338 at the ends with respect to the X-axis direction are smaller than the capacitance values of the detection electrodes 338 closer to the middle. A difference in capacitance value between the detection electrode 338 at the outermost with respect to the X-axis direction and the adjacent detection electrode 338 is larger than a difference in capacitance value between the adjacent detection electrodes 338 closer to the middle. In the touch position detection, a detection method using differences in capacitance value of the adjacent detection electrodes 338 with respect to the X-axis direction may be used to improve the noise immunity. In this case, a large noise may be produced due to an increase in difference in capacitance value described above. As a result, the sensitivity in position detection may be locally reduced in the edge areas with respect to the X-axis direction. As illustrated in FIG. 21, the capacitance values of the detection electrodes 338 of embodiment 3 at the outermost with respect to the X-axis direction are about equal to the capacitance values of the detection electrodes 338 closer to the middle. This may be because the capacitance values may be increased by the capacitors formed by the detection electrodes 338 at the outermost with respect to the X-axis direction and the second floating electrodes 54 in the non-display area NAA. The differences in capacitive value between the detection electrodes 338 at the outermost with respect to the X-axis direction and the adjacent detection electrodes 338 are about equal to the differences in capacitive value between the adjacent detection electrodes 338 closer to the middle. Therefore, even if the detection method using differences in capacitance value of the adjacent detection electrodes 338 with respect to the X-axis direction is used in the touch position detection to improve the noise immunity, the detection electrodes 338 at the outermost with respect to the X-axis direction are less likely to be subject to the noise. Therefore, the local reduction in sensitivity in the position detection is less likely to occur in the edge areas.

As described above, this embodiment includes the detection electrodes 338, the drive electrodes 339, the floating electrodes 345 (the first floating electrodes), and the second floating electrodes 54. The detection electrodes 338 extend along the first direction (the Y-axis direction). The detection electrodes 338 are arranged along the second direction (the X-axis direction) perpendicular to the first direction. The drive electrodes 339 extend along the second direction to overlap the detection electrodes 338 in the plan view. The drive electrodes 339 and the detection electrodes 338 that are arranged along the first direction form the capacitors. The floating electrodes 345 are arranged adjacent to the detection electrodes 338 in the plan view and to overlap the drive electrodes 339. The floating electrodes 345 and the adjacent detection electrodes 338 form the capacitors. The floating electrodes 345 and the overlapping drive electrodes 339 form the capacitors. The second floating electrodes 54 are arranged adjacent to and outer than the floating electrodes 345 that are adjacent to and outer than the detection electrodes 338 at the outermost with respect to the second direction among the detection electrodes 338. Furthermore, the second floating electrodes 54 are arranged not to overlap the drive electrodes 339. The second floating electrodes 54 and the detection electrodes 338 at the outermost form the capacitors.

According to the configuration, not only the detection electrodes 338 and the overlapping drive electrodes 339 form the capacitors but also the floating electrodes 345 and the adjacent detection electrodes 338 form the capacitance. Furthermore, the floating electrodes 345 and the overlapping drive electrodes 339 form the capacitors. Therefore, further higher sensitivity (the S/N ratio) can be achieved in the position detection. The capacitances between the detection electrodes 338 at the outermost with respect to the second direction among the detection electrodes 338 that are arranged along the second direction and the adjacent floating electrodes 345 are smaller in comparison to the detection electrodes 338 closer to the middle. Therefore, the differences in capacitance value tend to be larger and a large noise may be produced resulting in the local reduction in sensitivity in the position detection. The second floating electrode 54 are arranged adjacent to and outer than the floating electrodes 345 that are adjacent to and outer than the detection electrodes 338 at the outermost with respect to the second direction and not to overlap the drive electrodes 339. The second floating electrodes 54 and the detection electrodes 338 at the outermost form the capacitors. Therefore, large capacitances of the detection electrodes 338 at the outermost can be achieved and thus the differences in capacitance value between the detection electrodes 338 at the outermost and the detection electrodes 338 closer to the middle can be reduced. According to the configuration, the detection electrodes 338 at the outermost are less likely to be subject to the noise in the position detection and thus the local reduction in sensitivity in the position detection is less likely to occur in the edge areas.

The floating electrodes 345 include the segment floating electrodes 345S (segment first floating electrodes). The segment floating electrodes 345S are separated from one another in the first direction to overlap the drive electrodes 339, respectively. The second floating electrodes 54 are longer than the segment floating electrodes 345S in the first direction. According to the configuration, the capacitances between any of the drive electrodes 339 and the segment floating electrodes 345S in the floating electrodes 345 overlapping the drive electrodes 339 are less likely to be affected by the potentials of the other drive electrodes 339 adjacent to the drive electrodes 339. The second floating electrodes 54 do not overlap the drive electrodes 339. Therefore, the second floating electrodes 54 are less likely to be affected by the potentials of the drive electrodes 339. The second floating electrodes 54 can be formed to extend longer then the segment floating electrodes 345S in the first direction. According to the configuration, large capacitances between the adjacent detection electrodes 338 can be achieved.

The second floating electrodes 54 are formed form the transparent electrode film that forms the floating electrodes 345. According to the configuration, the cost required for forming the floating electrodes 345 and the second floating electrodes 54 can be reduced.

Fifth Embodiment

A fifth embodiment will be described with reference to FIG. 22. The fifth embodiment includes second floating electrodes 454 that are formed in a layer different from the fourth embodiment. Configurations, functions, and effects similar to those of the fourth embodiment will not be described.

Figure 22:
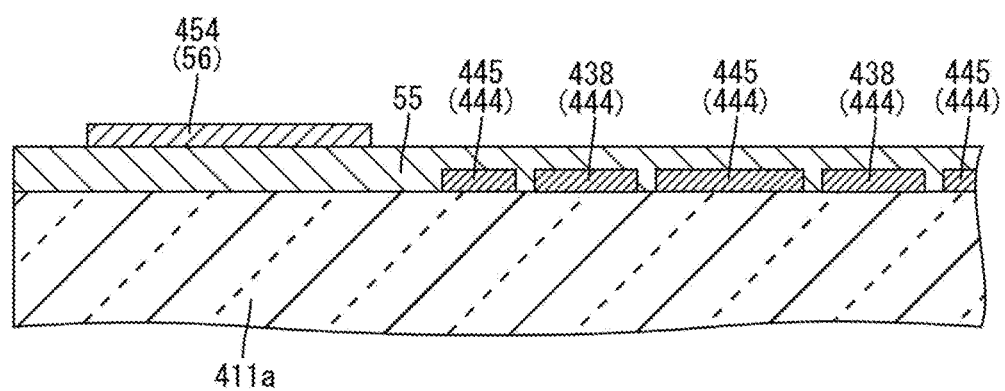
FIG. 22 is a cross-sectional view of a portion of the CF board at an end with respect to the short-side direction cut along the short-side direction according to a fifth embodiment of the present invention.

As illustrated in FIG. 22, the second floating electrodes 454 according to this embodiment are formed in the layer different from a layer in which detection electrodes 438 and floating electrodes 445 are formed. This embodiment includes an insulating layer 55 between those layers. Specifically, a transparent electrode film 444 (a first transparent electrode film) which forms the detection electrodes 438 and the floating electrodes 445 is located in the lowest layer on an outer surface of a CF board 411a and the insulating layer 55 is formed over the transparent electrode film 444 in an upper layer. The second floating electrodes 454 are formed from a second transparent electrode film 56 above the insulating layer 55. According to the configuration, the second floating electrodes 45 are properly insulated from the detection electrodes 438 and the floating electrodes 445.

As described above, the layer in which the floating electrodes 445 are formed and the layer in which the second floating electrodes 454 are formed are different from each other and the insulating layer 55 is provided between those layers. According to the configuration, the floating electrodes 445 and the second floating electrodes 454 are properly insulated with the insulating layer 55.

Sixth Embodiment

A sixth embodiment will be described with reference to FIG. 23. The sixth embodiment has a configuration that includes the configuration of the first embodiment and second floating electrodes 554 in the fourth embodiment. Configurations, functions, and effects similar to those of the first and the fourth embodiments will not be described.

Figure 23:
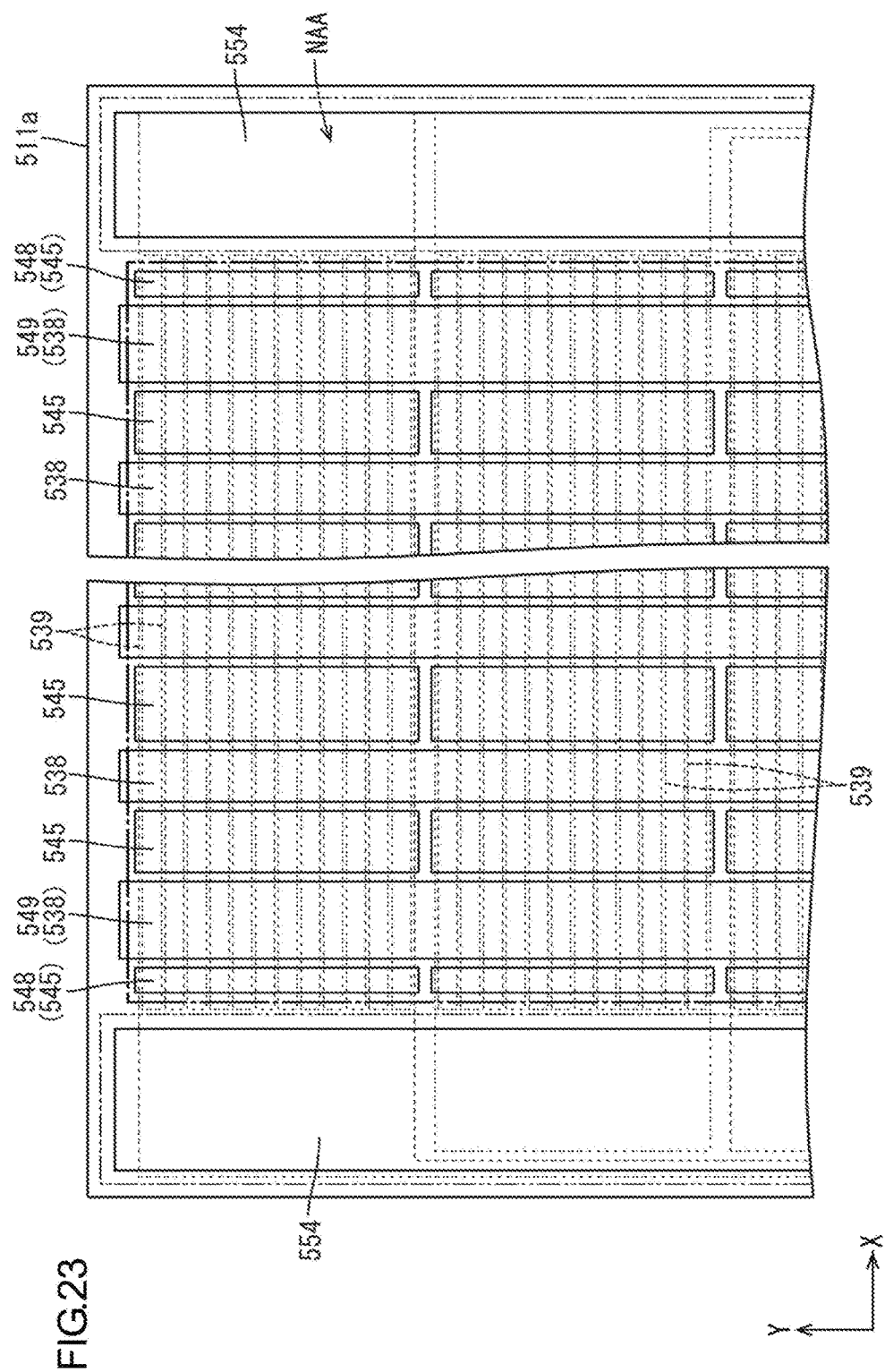
FIG. 23 is a magnified plan view of portions of a CF board at ends with respect to the short-side direction according to a sixth embodiment of the present invention.

As illustrated in FIG. 23, a CF board 511a according to this embodiment includes the second floating electrodes 554 in the non-display area NAA. The second floating electrodes 554 are arranged adjacent to and outer than narrow floating electrodes 548 at the outermost with respect to the X-axis direction among floating electrodes 545. The second floating electrodes 554 are physically and electrically isolated from detection electrodes 538 and the floating electrodes 545. The second floating electrodes 554 are formed in an island pattern. The second floating electrodes 554 and wide detection electrodes 549 at the outermost with respect to the X-axis direction form capacitors. According to the configuration, the wide detection electrodes 549 at the outermost with respect to the X-axis direction form capacitors not only with the floating electrodes 545 closer to the middle and adjacent narrow floating electrodes 548 closer to edges but also with the second floating electrodes 554. Further larger capacitances can be achieved. This configuration is preferable for increasing sensitivity (an S/N ratio) in position detection.

Seventh Embodiment

A seventh embodiment will be described with reference to FIG. 24. The seventh embodiment has a configuration that includes the configuration of the second embodiment and second floating electrodes 654 in the fourth embodiment. Configurations, functions, and effects similar to those of the second and the fourth embodiments will not be described.

Figure 24:
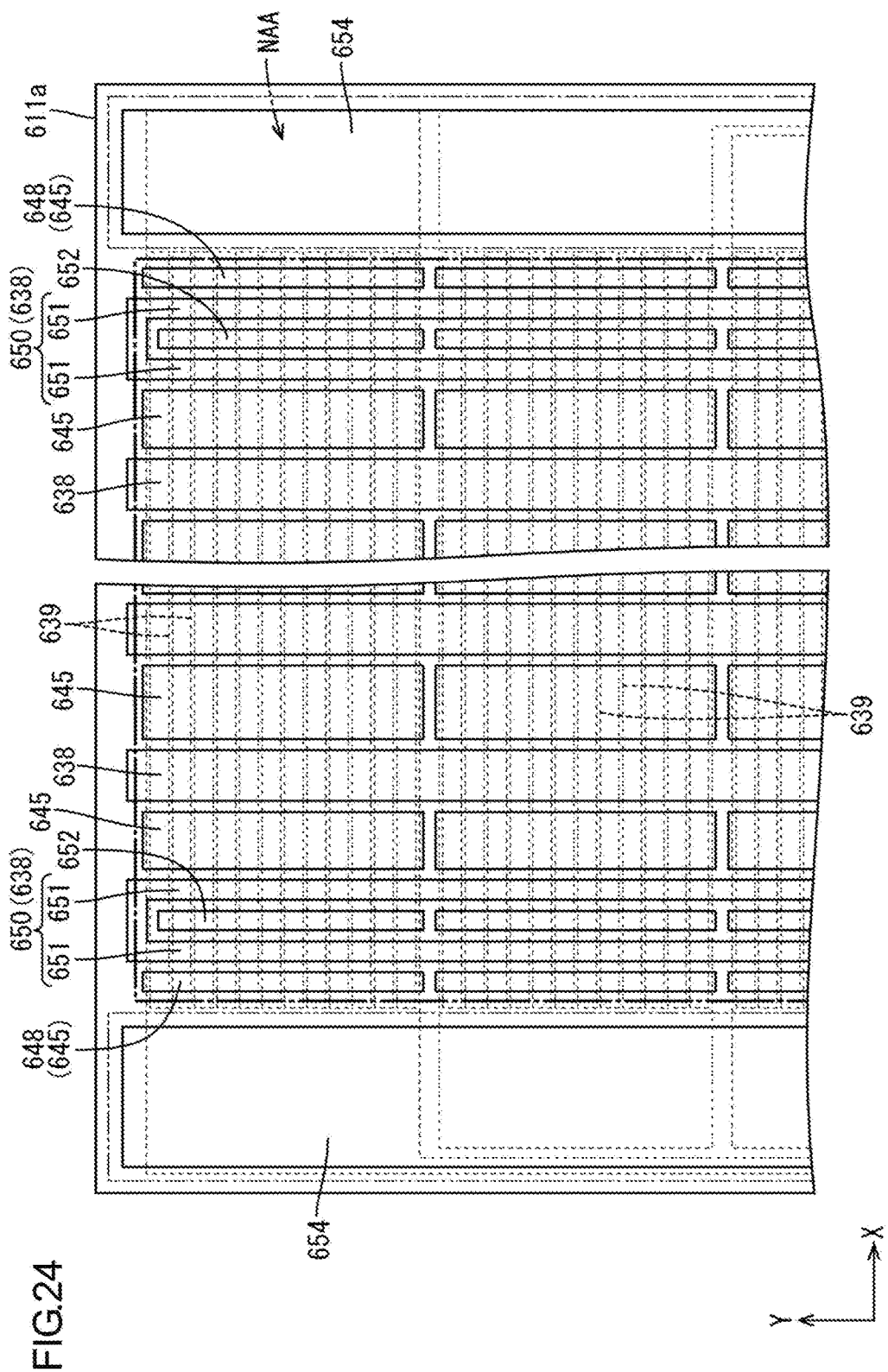
FIG. 24 is a magnified plan view of portions of a CF board at ends with respect to the short-side direction according to a seventh embodiment of the present invention.

As illustrated in FIG. 24, a CF board 611a according to this embodiment includes the second floating electrodes 654 in the non-display area NAA. The second floating electrodes 654 are arranged adjacent to narrow floating electrodes 648 of floating electrodes 645 at the outermost with respect to the X-axis direction. The second floating electrodes 654 are physically and electrically isolated from the detection electrodes 638 and the floating electrodes 645 and formed in an island pattern. The second floating electrodes 654 and branched-type detection electrodes 650 at the outermost with respect to the X-axis direction form capacitors. The branched-type detection electrodes 650 at the outermost with respect to the X-axis direction form capacitors not only with the floating electrodes 645 closer to the middle, the adjacent narrow floating electrodes 648 closer to the edges, and inter-branch-electrode floating electrodes 652 between branch electrodes 651 but also with the second floating electrodes 654. Further larger capacitances can be achieved.

This configuration is preferable for increasing sensitivity (an S/N ratio) in position detection.

Eighth Embodiment

An eighth embodiment will be described with reference to FIG. 25. The eighth embodiment includes a CF board 711a that includes ground electrodes 57 in the non-display area NAA of the first embodiment. Configurations, functions, and effects similar to those of the first embodiment will not be described.

Figure 25:
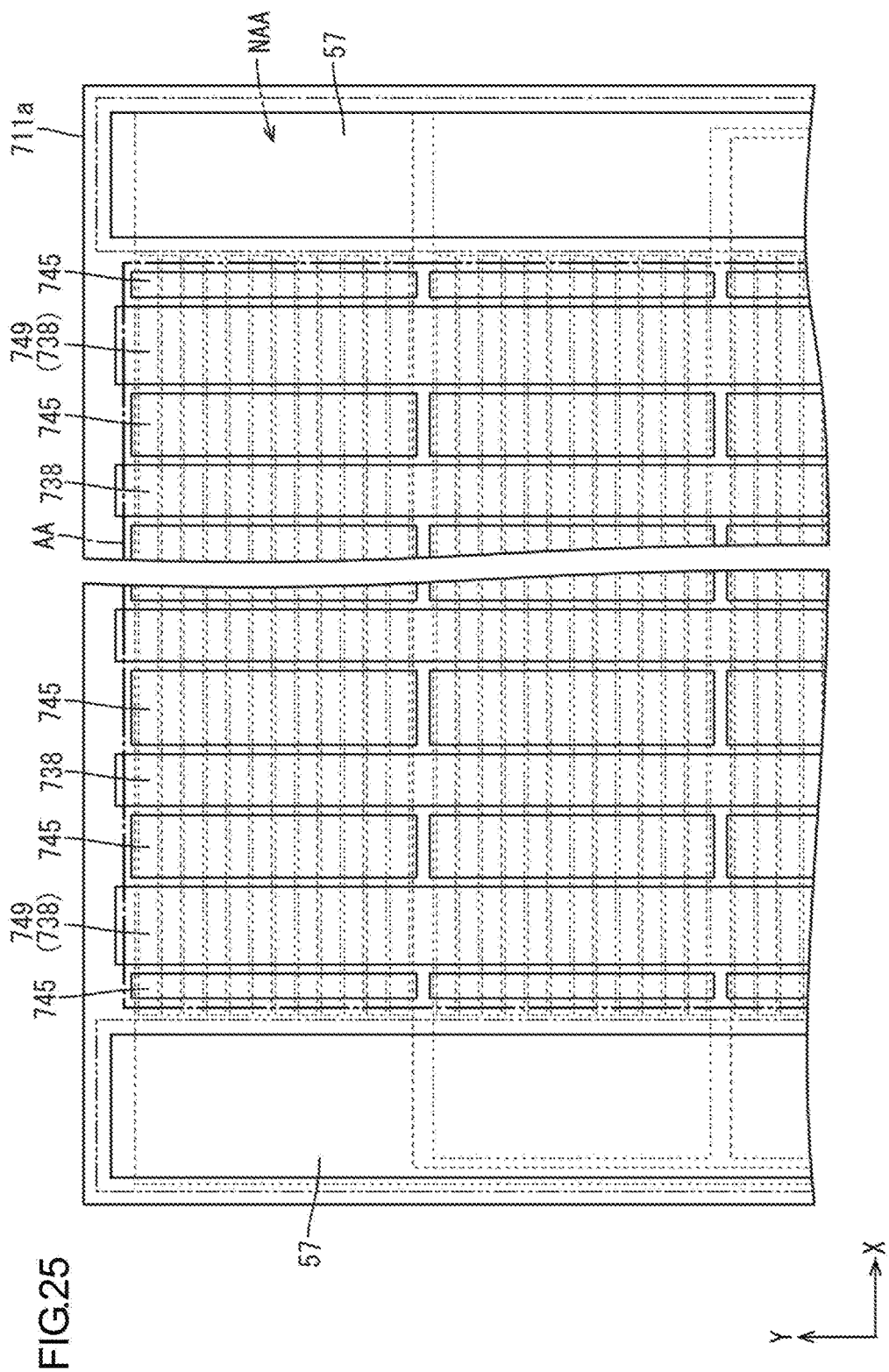
FIG. 25 is a magnified plan view of portions of a CF board at ends with respect to the short-side direction according to an eighth embodiment of the present invention.

As illustrated in FIG. 25, the CF board 711a according to this embodiment includes the ground electrodes 57 in the non-display area NAA. The ground electrodes 57 are formed from a transparent electrode film 744 that form detection electrodes 738 and floating electrodes 745. The ground electrodes 57 are formed in a layer on an outer surface of the CF board 711a in which the detection electrodes 738 and the floating electrodes 745 are formed. The ground electrodes 57 are arranged to sandwich a group of the detection electrodes 738 and the floating electrodes 745. Namely, the ground electrodes 57 are arranged in sections of the non-display areas on the right and the left of the display area AA (the touch area) to sandwich the display area AA with respect to the X-axis direction. The ground electrodes 57 extend along the Y-axis direction to have a length about equal to the long dimension of the display area AA. The ground electrodes 57 overlap monolithic circuits 737 of the array board (not illustrated) in the non-display area NAA in a plan view. According to the configuration, even if noises are generated from the monolithic circuits 737, the noises can be eliminated by the ground electrodes 57 and thus position detection performances of the touchscreen pattern are less likely to decrease. Especially, capacitance values of wide detection electrodes 749 at the outermost with respect to the X-axis direction among the detection electrodes 738 are less likely to vary. Therefore, a local reduction in sensitivity in the position detection is less likely to occur in the edge areas. Furthermore, the ground electrodes 57 are arranged to overlap position detection lines 740 in the plan view. According to the configuration, unnecessary couplings are less likely to be formed between the position detection lines 740 and the detection electrodes 738 and thus the position detection performances of the touchscreen pattern are further less likely to decrease.

Ninth Embodiment

A sixth embodiment will be described with reference to FIG. 26. The ninth embodiment includes a CF board 811a that includes ground electrodes 857 in the eighth embodiment arranged in the non-display area in the second embodiment. Configurations, functions, and effects similar to those of the second and the eighth embodiments will not be described.

Figure 26:
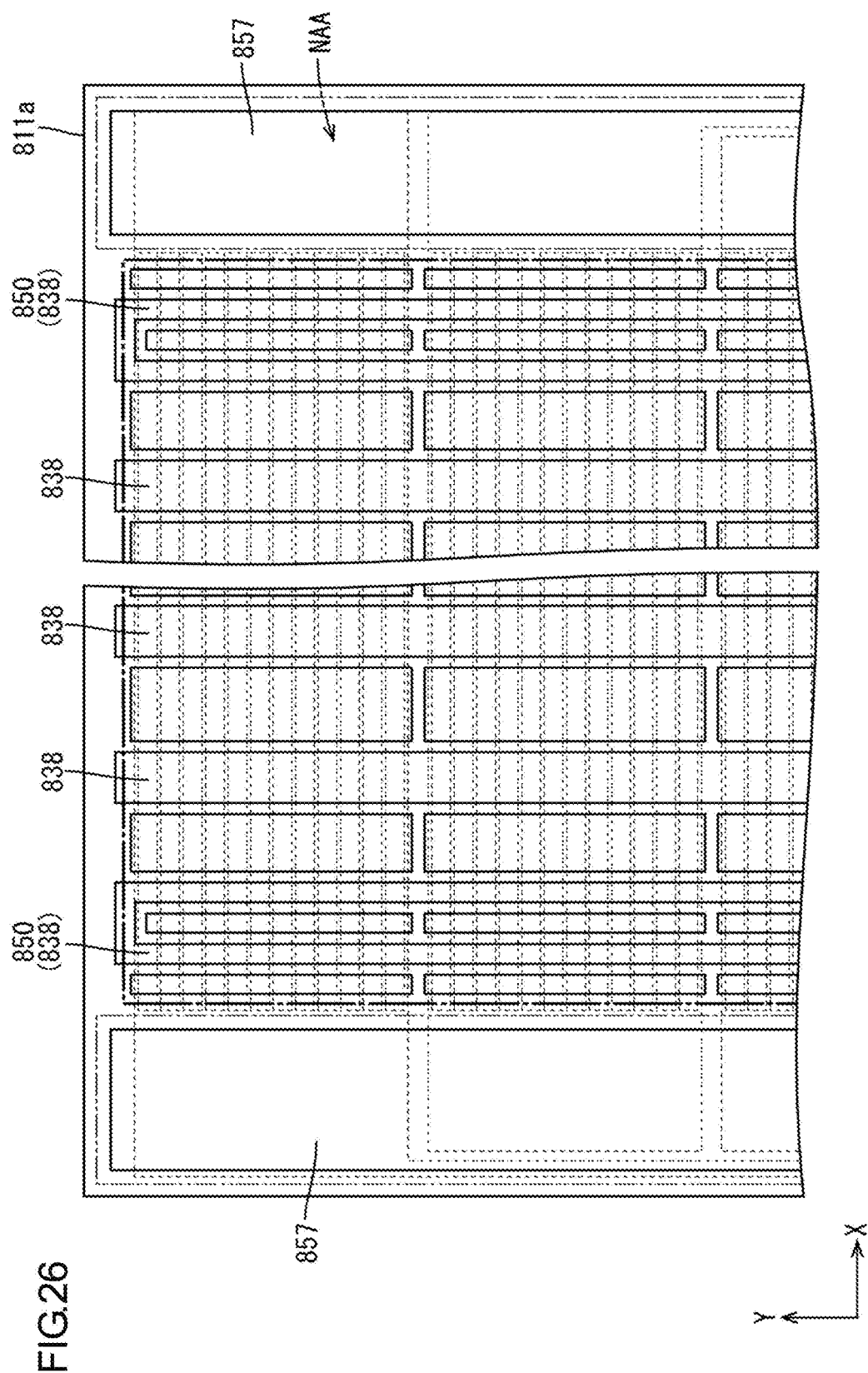
FIG. 26 is a magnified plan view of portions of a CF board at ends with respect to the short-side direction according to a ninth embodiment of the present invention.

As illustrated in FIG. 26, according to the ground electrodes 857 in this embodiment, even if noises are generated from monolithic circuits 837, the noises can be eliminated. Therefore, position detection performances of the touchscreen pattern are less likely to decrease. Especially, capacitance values of branched-type detection electrodes 850 at the outermost with respect to the X-axis direction among detection electrodes 838 are less likely to vary. Therefore, a local reduction in sensitivity in the position detection is less likely to occur in the edge areas.

Other Embodiments

The present invention is not limited to the embodiments, which have been described using the foregoing descriptions and the drawings. The following embodiments may be included in the technical scope of the present invention.

(1) In the above embodiments, the detection electrodes (including the wide detection electrodes and the branched-type detection electrodes), the floating electrodes (including the narrow floating electrodes), the inter-branch-electrode floating electrodes, the second floating electrodes, and the ground electrodes are formed on the outer surfaces of the CF boards. If a cover panel is disposed over a front surface of a CF board, one or multiple selected electrodes may be formed on a plate surface of the cover panel on the CF board side.

(2) In the fourth to the ninth embodiments, the second floating electrodes and the ground electrodes are formed on the outer surfaces of the CF boards. However, the second floating electrodes and the ground electrodes may be formed on inner surfaces of the CF boards.

(3) In each of the above embodiments, the drive electrodes are formed on the inner surface of the CF board. However, the common electrodes formed on the inner surface of the array board may be patterned to have the same two-dimensional configuration as that of the drive electrodes and the functions of the drive electrodes. In this case, the signals for the image display and the signals for the position detection may be chronologically shifted from each other and input to the common electrodes of the array board.

(4) The widths of the wide detection electrodes (or differences in width between the wide detection electrodes and the detection electrodes closer to the middle) in the first, the sixth, and the eighth embodiments may be altered as appropriate.

(5) The number of the branches of the branched-type detection electrodes, the widths of the branch electrodes, and the widths of the inter-branch-electrode floating electrodes in the second, the third, the seventh, and the ninth embodiments may be altered as appropriate.

(6) The second floating electrodes in the fourth or the fifth embodiment may be combined with the configuration of the third embodiment.

(7) The ground electrodes in the eighth or the ninth embodiment may be combined with the configuration of the third embodiment.

(8) The configuration of the fifth embodiment (the configuration including the second floating electrodes formed in the layer different from the layer in which the detection electrodes and the floating electrodes are formed) may be combined with the configuration of the sixth or the seventh embodiment.

(9) The ground electrodes in each of the eighth and the ninth embodiments may be formed in a layer different from the layer in which the detection electrodes and the floating electrodes are formed, similarly to the second floating electrodes in the fifth embodiment.

(10) Each of the above embodiments includes the liquid crystal panel that operates in FFS mode. The liquid crystal panel includes the array board that includes the pixel electrodes and the common electrodes. The pixel electrodes and the common electrodes overlap each other with the insulating film therebetween. However, the present invention can be applied to a liquid crystal panel that operates in VA mode. Such a liquid crystal panel includes an array board that includes pixel electrode and a CF board that includes common electrodes. The pixel electrodes and the common electrodes overlap each other with a liquid crystal layer therebetween. The present invention can be applied to a liquid crystal panel that operated in IPS mode.

(11) The dummy lines and the monolithic circuits can be eliminated from the configuration of each of the above embodiments.

(12) In each of the above embodiments, the touch area of the touchscreen pattern and the display area of the liquid crystal panel correspond to each other. However, they may not completely correspond to each other. For example, the touch area of the touchscreen pattern may correspond to an entire area of the display area of the liquid crystal panel and a portion of the non-display area (a portion closer to the display area).

(13) The semiconductor film of each of the above embodiments is the CG silicon thin film (a polysilicon thin film). However, oxide semiconductor or amorphous silicon may be used for the material of the semiconductor film.

(14) In each of the above embodiments, the color filters of the liquid crystal panel are in three colors of red, green, and blue. However, the present invention may be applied to color filters including four color portions of red, green, blue, and yellow.

(15) Each of the above embodiments is the transmissive liquid crystal display device including the backlight unit, which is an external light source. However, the present invention may be applied to a reflective-type liquid crystal display device configured to display an image using ambient light. In this case, the backlight unit can be omitted. The present invention may be applied to a semitransmissive-type liquid crystal display device.

(16) Each of the above embodiments includes the liquid crystal panel categorized into the small size or the small-to-medium size liquid crystal panel used for various electronic devices including portable information terminals, mobile phones (including smartphones), notebook personal computers (including tablet personal computers), digital photo frames, and portable video game players. However, the present invention may be applied to medium-size or large-size (or supersize) liquid crystal panels having screen sizes in a range from 20 inches to 90 inches. Such liquid crystal panels may be used for electronic devices including television devices, digital signage, and electronic blackboards.

(17) Each of the above embodiments includes the liquid crystal panel including the liquid crystal layer sandwiched between the substrates. However, the present invention may be applied to a display panel including functional organic molecules other than the liquid crystals between substrates.

(18) Each of the above embodiments includes the TFTs as the switching components of the liquid crystal panel. The present invention can be applied to a liquid crystal display device including a liquid crystal panel including switching components other than the TFTs (e.g., thin film diodes (TFD)). The present invention can be applied to a liquid crystal display device including a liquid crystal panel for black-and-white display other than the liquid crystal display device including the liquid crystal panel for color display.

(19) Each of the above embodiments is the liquid crystal display device including the liquid crystal panel as the display panel. However, the present invention can be applied to display device including other types of display panels (plasma display panel (PDP), organic EL panels, electrophoretic panels (EPDs)). The backlight unit can be omitted.

EXPLANATION OF SYMBOLS

10: liquid crystal display device (display device including position inputting function), 11: liquid crystal panel (display panel), 11*a*, 111*a*, 311*a*, 411*a*, 511*a*, 611*a*, 711*a*, 811*a*: array board, 11b: CF board (common board), 19: TFT (display component), 38, 138, 238, 338, 438, 538, 638, 738, 838: detection electrode (first position detection electrode), 39, 139, 339, 539, 639: drive electrode (second position detection electrode), 44, 344, 444: transparent electrode film, 45, 145, 345, 445, 545, 545, 645, 745: floating electrode (first floating electrode), 45S, 345S: segment floating electrode (segment first floating electrode), 48, 148, 248, 348, 548, 648: narrow floating electrode, 49, 549, 749: wide position detection electrode (wide first position detection electrode), 50, 250, 650, 850: branched-type detection electrode (branched-type first position detection electrode), 51, 251, 651: branch electrode, 52, 252, 652: inter-branch-electrode floating electrode, 54, 454, 554, 654: second floating electrode, 55: insulating layer, AA: display area, TPP: touch-screen pattern (position inputting device)

The invention claimed is:

1. A position inputting device comprising:
   first position detection electrodes extending along a first direction and being arranged along a second direction perpendicular to the first direction;
   second position detection electrodes extend along the second direction and being arranged along the first direction to overlap the first position detection electrodes in a plan view, wherein the second position detection electrodes and the first position detection electrodes form capacitors; and
   floating electrodes arranged adjacent to the first position detection electrodes, respectively, in a plan view and to overlap the second position detection electrodes in the plan view, wherein the floating electrodes and the adjacent first position detection electrodes form capacitors, and the floating electrodes and the overlapping second position detection electrodes form capacitors;
   wide first position detection electrodes included in the first position detection electrodes and arranged at outermost with respect to the second direction, wherein the wide first position detection electrodes have a width larger than a width of the first position detection electrodes closer to middle;
   branched-type first position detection electrodes included in the first position detection electrodes and arranged at outermost with respect to the second direction, wherein each of the branched-type first position detection electrodes includes branch electrodes extending in the first direction and the branch electrodes are arranged along the second direction and connected together; and
   inter-branch-electrode floating electrodes sandwiched between the branch electrodes, wherein the inner-branch-electrode floating electrodes and the branch electrodes form capacitors.

2. The position inputting device according to claim 1, wherein a sum of the widths of the branch electrodes of each of the branched-type first position detection electrodes is equal to the width of each of the first position detection electrodes closer to the middle.

3. The position inputting device according to claim 1, wherein
   the floating electrodes or the first floating electrodes include narrow floating electrodes or narrow first floating electrodes having a width smaller than a width of the floating electrodes or the first floating electrodes closer to the middle.

4. A display device with a position inputting function comprising:
   the position inputting device according to claim 1; and
   a display panel comprising the position inputting device.

5. The display device with a position inputting function according to claim 4,
   wherein
   the display panel comprises an array board and a common board, wherein the array board includes at least display components arranged in a display area in which an image is displayed and the common board is arranged opposite the array board with a gap, and
   the position inputting device is integrated with the display panel such that the second position detection electrodes are arranged on a plate surface of the common board facing the array board in the display area, and the first position detection electrodes and the floating electrodes or the first floating electrodes are arranged on a plate surface of the common board opposite from the array board in the display area.

6. A position inputting device comprising:
   first position detection electrodes extending along a first direction and being arranged along a second direction perpendicular to the first direction;
   second position detection electrodes extend along the second direction and being arranged along the first direction to overlap the first position detection electrodes in a plan view, wherein the second position detection electrodes and the first position detection electrodes form capacitors;
   first floating electrodes arranged adjacent to the first position detection electrodes, respectively, in a plan view and to overlap the second position detection electrodes in the plan view, wherein the floating electrodes and the adjacent first position detection electrodes form capacitors, and the floating electrodes and the overlapping second position detection electrodes form capacitors; and
   second floating electrodes arranged adjacent to and outer than the first floating electrodes with respect to the second direction, wherein the first floating electrodes are adjacent to and outer than the first position detection electrodes arranged at outermost with respect to the second direction, wherein the second floating electrodes are arranged not to overlap the second position detection electrodes, and wherein the second floating electrodes and the first position detection electrodes at the outermost form capacitors.

7. The position inputting device according to claim 6, wherein
   the first floating electrodes include segment first floating electrodes separated from one another in the first direction to overlap the second position detection electrodes, respectively, and
   the second floating electrodes extend longer than the segment first floating electrodes in the first direction.

8. The position inputting device according to claim 6, wherein
   the second floating electrodes are formed from a transparent electrode film that forms the first floating electrodes.

9. The position inputting device according to claim 6, wherein
   the first floating electrodes are formed in a layer different from a layer in which the second floating electrodes are formed, and
   the position inputting device further comprises an insulating layer between the layers.

10. The position inputting device according to claim 6, wherein the floating electrodes or the first floating electrodes include narrow floating electrodes or narrow first floating electrodes having a width smaller than a width of the floating electrodes or the first floating electrodes closer to the middle.

11. A display device with a position inputting function comprising:

the position inputting device according to claim 6; and a display panel comprising the position inputting device.

12. The display device with a position inputting function according to claim 11, wherein the display panel comprises an array board and a common board, wherein the array board includes at least display components arranged in a display area in which an image is displayed and the common board is arranged opposite the array board with a gap, and the position inputting device is integrated with the display panel such that the second position detection electrodes are arranged on a plate surface of the common board facing the array board in the display area, and the first position detection electrodes and the floating electrodes or the first floating electrodes are arranged on a plate surface of the common board opposite from the array board in the display area.

* * * * *